(12) United States Patent
Kasuya et al.

(10) Patent No.: US 9,138,828 B2
(45) Date of Patent: Sep. 22, 2015

(54) METHOD OF PRODUCTION OF WELDED JOINT

(75) Inventors: Tadashi Kasuya, Tokyo (JP); Ryuichi Shimura, Tokyo (JP); Manabu Mizumoto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 13/818,330

(22) PCT Filed: Feb. 23, 2011

(86) PCT No.: PCT/JP2011/054664
§ 371 (c)(1),
(2), (4) Date: Feb. 22, 2013

(87) PCT Pub. No.: WO2012/114532
PCT Pub. Date: Aug. 30, 2012

(65) Prior Publication Data
US 2013/0153092 A1  Jun. 20, 2013

(51) Int. Cl.
*C21D 9/08* (2006.01)
*C21D 9/50* (2006.01)
(Continued)

(52) U.S. Cl.
CPC . *B23K 31/02* (2013.01); *B23K 9/02* (2013.01); *B23K 9/0256* (2013.01); *B23K 9/167* (2013.01); *B23K 9/173* (2013.01); *B23K 9/23* (2013.01); *B23K 33/004* (2013.01); *B24C 1/10* (2013.01); *C21D 1/40* (2013.01); *C21D 1/42* (2013.01); *C21D 7/06* (2013.01); *C21D 9/50* (2013.01);
(Continued)

(58) Field of Classification Search
CPC ........ B23K 9/02; B23K 9/0256; B23K 9/167; B23K 35/00
USPC .................. 148/524, 526, 529, 534
See application file for complete search history.

(56) References Cited

U.S. PATENT DOCUMENTS 4,711,986 A * 12/1987 Lillquist et al. .......... 219/130.01
2009/0183804 A1 * 7/2009 Zhao et al. .................. 148/567

FOREIGN PATENT DOCUMENTS

| CN | 101270459 B * | 6/2010 | ................ C22F 1/00 |
| EP | 0 850 719 | 7/1998 | |

(Continued)

OTHER PUBLICATIONS

Japanese Decision to Grant dated Oct. 18, 2011 issued in corresponding Japanese Application No. 2011-531076 [with English Translation].

*Primary Examiner* — Kaj K Olsen
*Assistant Examiner* — Alexander Polyansky
(74) *Attorney, Agent, or Firm* — Kenyon & Kenyon LLP

(57) ABSTRACT

A method of production of a welded joint which enables improvement of the fatigue strength in the case where measures for improvement of the fatigue strength cannot be applied due to the presence of structurally sealed regions is provided. The method is provided with a first weld step which performs welding by forming an inside weld toe or root part by using a weld metal with a transformation start temperature of 175° C. to 400° C. in range, at least parts of the weld metal forming the inside weld toe or root part which was formed at the first weld step becoming unmelted parts, and a second weld step which performs welding for building up the weld metal by a single pass by a weld heat input by which all of the unmelted parts are retransformed to austenite so as to introduce compressive residual stress to the inside weld toe or root part.

11 Claims, 7 Drawing Sheets

(51) Int. Cl.

| | |
|---|---|
| *B23K 31/02* | (2006.01) |
| *B23K 9/02* | (2006.01) |
| *B23K 9/025* | (2006.01) |
| *B23K 9/167* | (2006.01) |
| *B23K 9/173* | (2006.01) |
| *B23K 9/23* | (2006.01) |
| *B23K 33/00* | (2006.01) |
| *B24C 1/10* | (2006.01) |
| *C21D 7/06* | (2006.01) |
| *C21D 1/40* | (2006.01) |
| *C21D 1/42* | (2006.01) |
| *C22C 38/02* | (2006.01) |
| *C22C 38/04* | (2006.01) |
| *C22C 38/08* | (2006.01) |
| *C22C 38/12* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/38* | (2006.01) |
| *C22C 38/40* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/58* | (2006.01) |
| *C22C 38/00* | (2006.01) |
| *C21D 9/52* | (2006.01) |
| *C21D 8/02* | (2006.01) |

(52) U.S. Cl.
CPC ............... *C22C 38/02* (2013.01); *C22C 38/04* (2013.01); *C22C 38/08* (2013.01); *C22C 38/12* (2013.01); *C22C 38/20* (2013.01); *C22C 38/22* (2013.01); *C22C 38/24* (2013.01); *C22C 38/26* (2013.01); *C22C 38/28* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *B23K 2201/045* (2013.01); *B23K 2203/04* (2013.01)

(56) References Cited

FOREIGN PATENT DOCUMENTS

| | | |
|---|---|---|
| EP | 2 168 705 | 3/2010 |
| EP | 1 108 495 | 6/2011 |
| JP | 10-296480 | 11/1998 |
| JP | 11-138290 | 5/1999 |
| JP | 2005-279768 | 10/2005 |
| JP | 2007-44698 | 2/2007 |
| JP | 2007-268591 | 10/2007 |
| JP | 2008-18458 | 1/2008 |
| JP | 2008-137024 | 6/2008 |
| JP | 2008-307561 | 12/2008 |
| JP | 2001-246495 | 9/2011 |

* cited by examiner

Fig.1
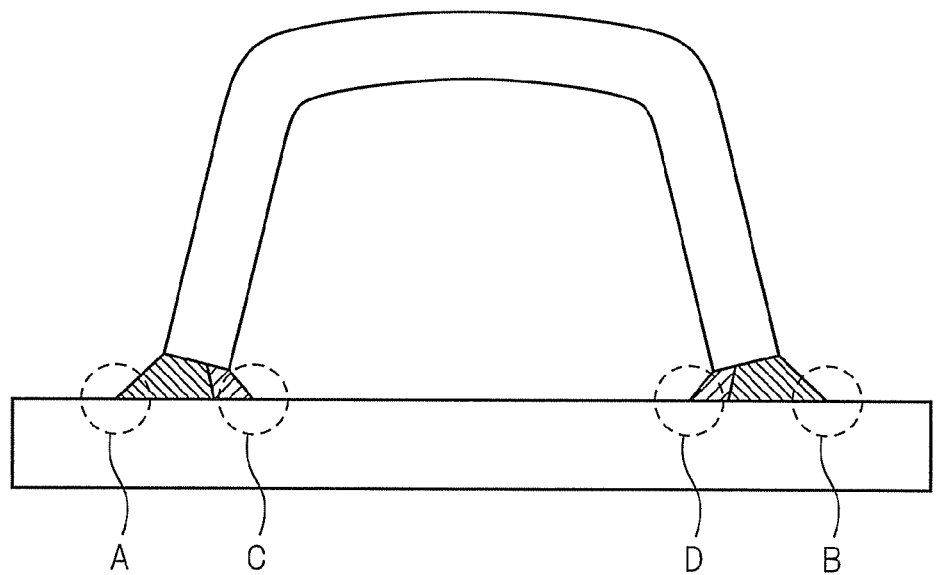
A  C                    D  B
Fig.2a                 Fig.2b
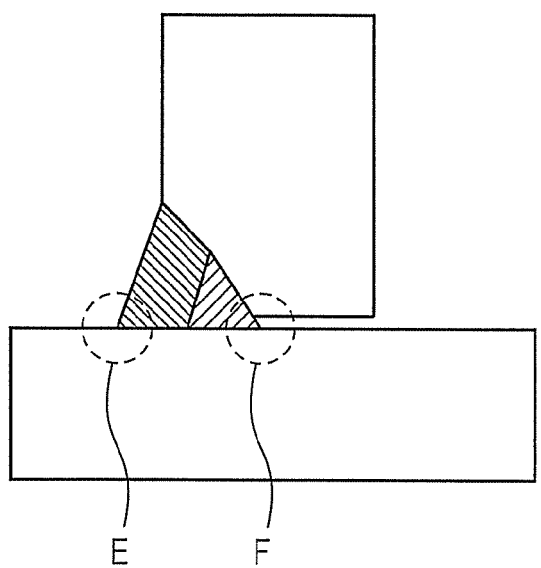   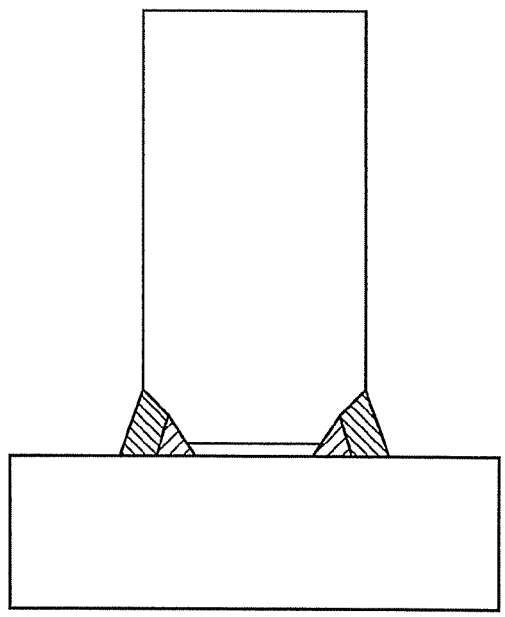
E  F

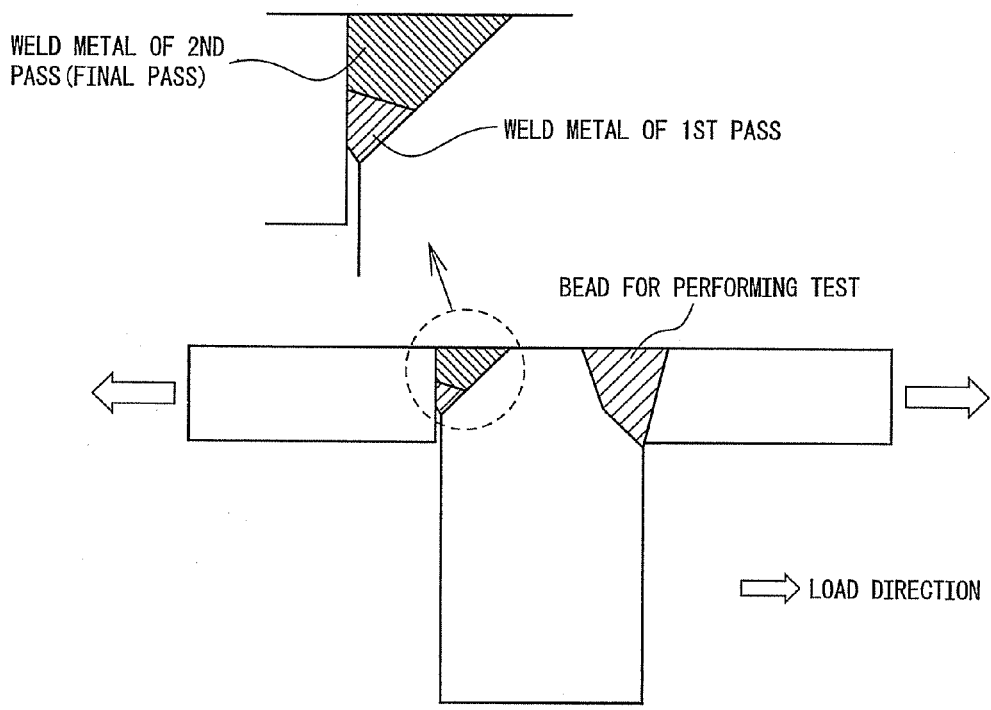
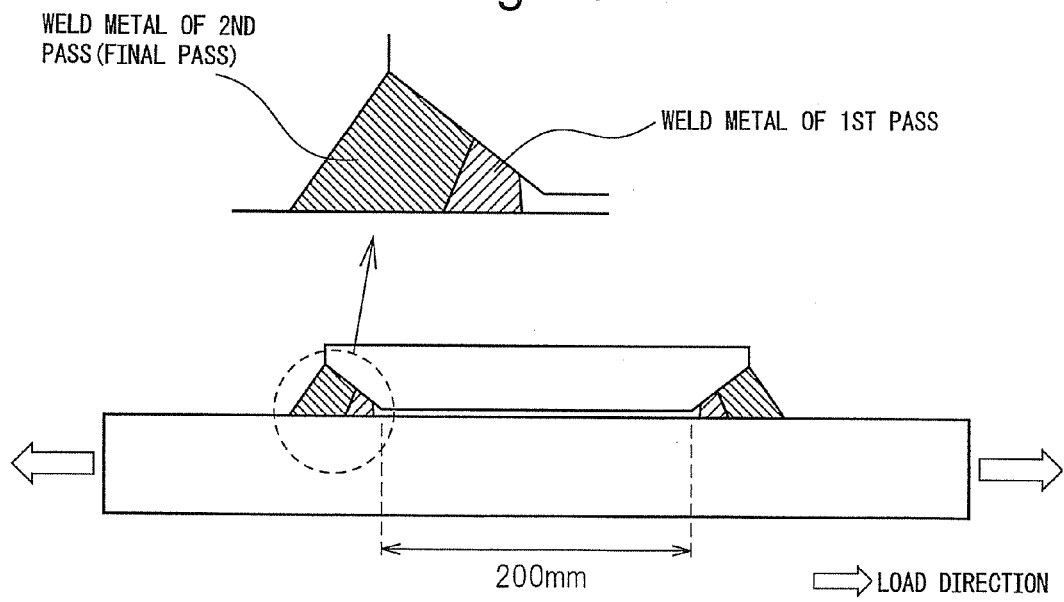

METHOD OF PRODUCTION OF WELDED JOINT

This application is a national stage application of International Application No. PCT/JP2011/054664, filed Feb. 23, 2011.

TECHNICAL FIELD

The present invention relates to a method of production of a welded joint, more particularly relates to a method of production of a welded joint which, when the structure of the welded joint or structure of the welded structure is a structure which can only be welded from one side of the steel material, enables improvement of the fatigue strength of the weld toe or root part at the opposite side from the side where welding was performed—where shot peening and other measures for improving fatigue strength are difficult.

BACKGROUND ART

The fatigue characteristics of a welded structure are extremely important characteristics in determining the lifetime of a structure itself. As means for improving such fatigue strength of a welded structure, there are the methods of smoothing the shape of the weld toe to ease the stress concentration as much as possible or applying peening etc. to locally impart compressive residual stress at the places where fatigue occurs. Furthermore, as shown in the art described in PLT 1, the method of lowering the transformation start temperature of the weld metal and improving the fatigue strength by the effect of reduction of the residual stress by utilizing expansion due to transformation etc. have been disclosed.

However, in the prior art such as the art described in PLT 1, for example, the means for application to a joint where the weld toe is structurally sealed off was not disclosed.

FIG. 1 is a view showing one example of welded joints and a welded structure. This FIG. 1 is a schematic view for explaining the structure in the case of attaching a member having a U-shaped cross-section to a flat plate by welding so as to secure bending rigidity. In the case of the example shown in FIG. 1, the U-shaped member is welded with the flat plate at two locations. The joints are T-joints. At this time, fatigue cracks occur at the stress concentration parts, so in the example shown in FIG. 1, occur at the four locations shown by the symbols A to D. Among these, the two locations shown by the symbols A and B are positioned at the outside of the welded structure, so repair is easy. Further, it is possible to work the weld toes smooth in advance or perform peening to impart compressive residual stress so as to improve the fatigue strength.

However, the weld toes at the two locations shown by the symbols C and D in FIG. 1 are sealed off in structure, so cannot be post-treated after the end of welding. This is because of the extremely simple reason that in the case of peening or other such mechanical post-treatment methods, it is necessary to directly contact and treat the parts where fatigue would become a problem (see locations of symbols C and D in FIG. 1). Therefore, the fatigue strength of the welded structure shown in FIG. 1 is determined by the fatigue strengths of the weld toes shown by the symbols C and D. No matter how much the fatigue strengths of the weld toes shown by the symbols A and B are improved, the problem remains that the fatigue strength of the welded structure as a whole is not improved.

On the other hand, even in the art described in PLT 1 or 2, the art disclosed in the literature only discloses art for joints in the case where the weld toes are positioned at the outside. For example, in an actual welded structure, how to use the weld material disclosed in PLT 1 in the case where fatigue cracks occur in the weld toes positioned at the inside is not necessarily clear. In the case of FIG. 1, the T-joint is completed by two-pass welding, but in this case, the heat when forming the subsequent weld beads, that is, when forming the outside weld beads, cancels the residual stress formed by the inside beads, so the inherent effect cannot be obtained. On the other hand, if forming T-joints such as shown in FIG. 1 by single-pass welding, butt solidified weld results and hot cracks are liable to form at the weld zones. Further, when adding alloying elements to the weld metal to an extent which reduces the residual stress, the hot crack sensitivity becomes far higher than with an ordinary weld material. Art which avoids this problem while improving the fatigue strength has been considered necessary.

CITATION LIST

Patent Literature

PLT 1: Japanese Patent Publication (A) No. 11-138290
PLT 2: Japanese Patent Publication (A) No. 2001-246495

SUMMARY OF INVENTION

Technical Problem

As explained above, the fatigue strength of a welded structure is a factor which determines the lifetime of the welded structure as a whole. In particular, the fatigue strength of the welded structure as a whole is determined at the part with the lowest fatigue strength.

The present invention was made in consideration of the above problems and has as its object the provision of a method of production of a welded joint which enables the fatigue strength to be improved in a case where, due to the presence of a structurally sealed off region etc., a weld toe or root part where the fatigue strength becomes an issue cannot be shot peened or otherwise mechanically treated or formed with a bead or otherwise welded as a measure to improve the fatigue strength.

Solution to Problem

The inventors, from the above viewpoint, engaged in intensive research on means enabling improvement of the fatigue strength of a welded joint to be achieved in a case where there is a weld toe or root part of a structure for which mechanical measures for improvement of fatigue strength are not possible. Further, they discovered that by forming in advance a weld metal which will expand by transformation at a low temperature at the weld toe side or root part side and causing retransformation of that weld metal in the subsequent welding or by using induction heating or ohmic heating to cause the weld metal to retransform, it is possible to again cause the formation of the once lost compressive residual stress and thereby achieve an improvement of the fatigue strength of the weld toe or root part. The present invention was made based on such research and has as its gist the following.

(1) A method of production of a welded joint which welds joining parts of steel materials by multipass welding, the method of production of a welded joint characterized in that the multipass welding comprises a first weld step of welding by a first pass using a welding material with a transformation start temperature of the weld metal of 175° C. to 400° C. in range and a second weld step of then welding to build up the weld metal by one pass or two passes or more so that part of the weld metal which was formed in the first weld step becomes an unmelted part, in which second weld step the weld heat of the final pass causing the unmelted part to completely retransform to austenite.

(2) A method of production of a welded joint which welds joining parts of steel materials by multipass welding, the method of production of a welded joint characterized in that the multipass welding comprises a first weld step of welding by a first pass using a welding material with a transformation start temperature of the weld metal of 175° C. to 400° C. in range and a second weld step of then welding to build up the weld metal by one pass or two passes or more so that part of the weld metal which was formed in the first weld step becomes an unmelted part and has a step of then applying heat treatment which causes the unmelted part to completely retransform to austenite.

(3) A method of production of a welded joint as set forth in (1) or (2) characterized by forming the joined part of the welded joint only by welding from one side.

(4) A method of production of a welded joint as set forth in any one of (1) to (3) characterized in that the welded joint is a structure where welding is only possible from one side of the welded joint due to the structure of the welded joint or the structure of the welded structure.

(5) A method of production of a welded joint as set forth in any one of (1) to (4) characterized in that the welded joint is a T-joint, corner joint, or lap joint.

(6) A method of production of a welded joint as set forth in (1), wherein the welded joint is a T-joint, the joined part of the T-joint is comprised of an unwelded zone and weld zones at the two sides sandwiching the unwelded zone, the weld zones are multipass welded from only one side by partial penetration welding, and a length of the unwelded zone is at least 3 times a maximum value of a weld bead thickness of each pass in the multipass welding.

(7) A method of production of a welded joint as set forth in (1) wherein the welded joint is a cross joint, the joined part of the cross joint is comprised of an unwelded zone and weld zones at the two sides sandwiching the unwelded zone, the weld zones are multipass welded by partial penetration welding from only one side, and the length of the unwelded zone present between multipass welding operations and the minimum value of the thickness of the steel materials forming the T-joint are at least three times the maximum value of the thickness of the weld bead at each pass in the multipass welding operations.

(8) A method of production of a welded joint as set forth in (2) wherein the welded joint is a T-joint or cross joint, the joined part of the welded joint is comprised of an unwelded zone and weld zones at the two sides sandwiching the unwelded zone, the weld zones are multipass welded by partial penetration welding from only one side, and the heat treatment is performed after finishing the multipass welding operations for all weld zones.

(9) A method of production of a welded joint as set forth in any one of (2) to (5) and (8) characterized in that the heat treatment step uses a heating method of either induction heating or ohmic heating.

(10) A method of production of a welded joint as set forth in any one of (1) to (9) characterized in that the composition of the weld metal which is used in the first weld step comprises, by mass %, C: 0.01 to 0.15%, Si: 0.2 to 0.8%, Mn: 0.4 to 2.0%, P: 0.03% or less, S: 0.02% or less, and Ni: 7.0 to 11.5% and, furthermore, comprises one or more of Cu: 0.4% or less, Ti: 0.1% or less, Nb: 0.1% or less, V: 0.5% or less, Cr: 3.0% or less, and Mo: 2.0% or less.

(11) A method of production of a welded joint as set forth in any one of (1) to (10) characterized in that the composition of the weld metal which is used in the first weld step comprises, by mass %, C: 0.005 to 0.10%, Si: 0.1 to 0.7%, Mn: 0.1 to 2.0%, P: 0.03% or less, S: 0.02% or less, Ni: 4.0 to 8.0%, and Cr: 8.0 to 15.0% and further comprising one or more of Mo: 2.0% or less, Cu: 0.4% or less, Ti: 0.1% or less, Nb: 0.1% or less, and V: 0.5% or less.

(12) A method of production of a welded joint as set forth in any one of (1) to (11) characterized by, after the second weld step, grinding a toe part of the weld bead at the welded side for post-treatment.

(13) A method of production of a welded joint as set forth in any one of (1) to (11) characterized by, after the second weld step, peening a toe part of the weld bead at the welded side for post-treatment.

(14) A method of production of a welded joint as set forth in any one of (1) to (11) characterized by, after the second weld step, reheating by TIG arc welding a toe part of the weld bead at the welded side.

(15) A welded joint which is produced by a method of production of a welded joint as set forth in any one of (1) to (14).

Advantageous Effects of Invention

According to the method of production of a welded joint of the present invention, even when, due to problems in the structure of the welded joint or the structure of the welded structure, there is an inside weld toe or root part of a structure which cannot be post-treated by mechanical means or by welding, it is possible to improve the fatigue strength of the welded joint, possible to improve the lifetime of the welded structure as a whole, and possible to repair an existing welded structure so as to extend the lifetime of the welded structure. The industrial significance is extremely great.

BRIEF DESCRIPTION OF DRAWINGS

FIG. 1 is a schematic view for explaining one example of the method of production of a welded joint of the present invention and a cross-sectional view showing an example of welded joints of a structure where the inside weld toes are structurally sealed off.

FIG. 2A is a schematic view for explaining another example of the method of production of a welded joint of the present invention and a cross-sectional view showing an example of a welded joint which has a root part which can only be welded from one side, which is formed by partial penetration welding, and which cannot be approached from the outside.

FIG. 2B is a schematic view for explaining another example of the method of production of a welded joint of the present invention and a cross-sectional view showing an example of a welded joint where the joined part of a T-joint is comprised of an unwelded zone and weld zones at the two sides sandwiching the unwelded zone and where the weld zones have root parts which are formed by partial penetration welding and which cannot be approached from the outside.

FIG. 9 is a schematic view for explaining one example of the method of production of a welded joint of the present invention and a cross-sectional view showing a load direction when performing a fatigue test on a corner joint in Example 5.

FIG. 10 is a schematic view for explaining one example of the method of production of a welded joint of the present invention and a cross-sectional view showing a load direction when performing a fatigue test on a lap joint in Example 5.

DESCRIPTION OF EMBODIMENTS

Figure 3:
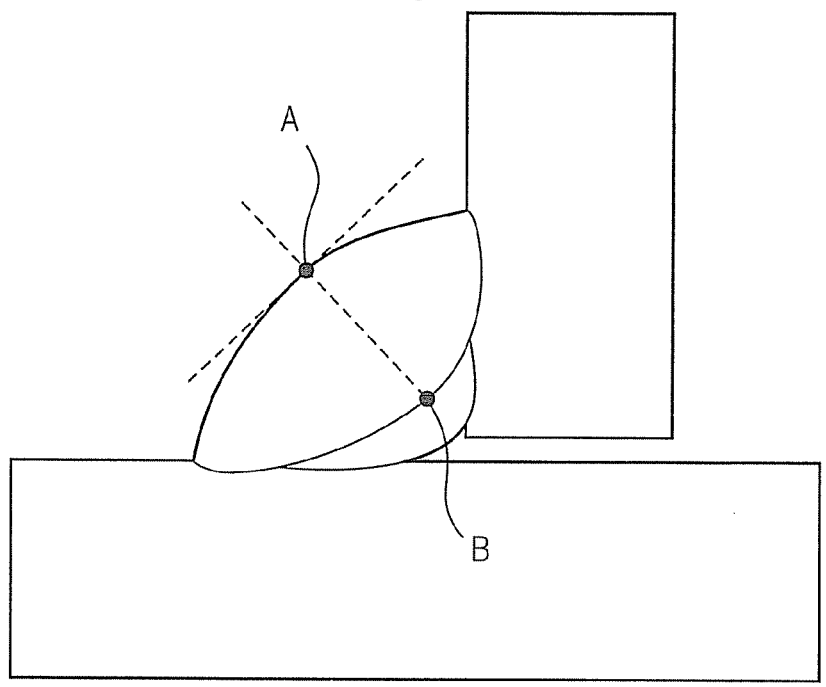
FIG. 3 is a schematic view for explaining a definition of weld metal thickness in the present invention.

Below, embodiments of the method of production of a welded joint of the present invention will be explained while suitably referring to FIG. 1 to FIG. 13. Note that, the embodiments are explained in detail for enabling better understanding of the gist of the method of production of a welded joint of the present invention, so do not limit the present invention unless particularly indicated.

First, the technical idea of the present invention will be explained.

In the present invention, the methods of improving the fatigue strength may be roughly divided into three types. The first is a method such as shot peening where impact or other dynamic or mechanical treatment is applied to the surface, the second is a method such as adjusting the composition of the weld metal and utilizing the expansion by transformation of the weld metal or otherwise specially designing the composition of the steel material or weld material or other material features, and the third is a method of applying heat after welding etc. These methods are respectively called the "mechanical method", "material method", and "heat treatment method" in the present invention.

According to this classification, the present invention can be said to be a method using both a material method and a heat treatment method.

The present invention, as already explained, has as its object the improvement of the fatigue strength of a welded joint having a structure in which mechanical treatment or other methods of improvement of fatigue strength cannot be applied. In general, as such a structure, there is the case where the welded structure has a partially sealed off structure or where a welded joint has partially penetrated or other unwelded zone present and therefore direct peening, grinding, etc. are not possible.

Further, when applying art for improving the fatigue strength by reducing the residual stress utilizing expansion by transformation of the weld metal (below, a weld material having such a system of composition being referred to as a "low temperature transformation weld material" and the weld metal which is formed at this time being referred to as a "low temperature transformation weld metal" in some cases), when the number of welding passes is a single pass, an effect of reduction of the residual stress can be expected and an effect of improvement of the fatigue strength can also be expected. However, a low temperature transformation weld material is a system of composition which comprises a large amount of Ni, Cr, etc. and where hot cracks easily occur. In such a case, depending on the shape of the joint, if performing single-pass welding, butt solidified weld easily occurs at the weld metal and the danger of hot cracks being caused becomes extremely high. When there are cracks at the weld zone, even if compressing the residual stress of the weld toe, fatigue cracks occur from the cracks inside of the weld metal, so this does not lead to an improvement of the fatigue strength of the joint as a whole. Conversely, if performing multipass welding to avoid hot cracks, the weld toe or root part where the fatigue becomes a problem is formed by the first pass due to the joint shape, so the problem arises that the weld heat of the second pass on causes loss of the compressive residual stress.

As a joint where measures for improvement of fatigue strength by such mechanical treatment etc. are not possible, the case may be considered where, as shown in FIG. 1, there is a sealed off space in structure. Further, as shown in FIG. 2A, the case where, as in the welded joint by partial penetration welding, even if there is no sealed off space, there is an unwelded zone, may be considered. In the latter case it is not possible to directly mechanically treat the stress concentration part where fatigue becomes an issue (see part shown by symbol F in FIG. 2A). In the present invention, the locations shown by the symbols C and D in FIG. 1 in the case, as shown in FIG. 1, where mechanical treatment is not possible due to the presence of a sealed off space are called "inside weld toes", while in the case, as shown in FIG. 2a, where there is an unwelded zone, they are called the "root parts".

In the present invention, the above-mentioned problem of fatigue strength of the inside weld toes 21 or root parts 41 at the sealed off space side is solved as follows. The present invention discloses the two types of methods of the case of not performing heat treatment after welding (see claim 1) and the case of performing heat treatment (see claim 2). In the present invention, the former is called the non-heat treatment type, while the latter is called the "heat treatment type".

First, the non-heat treatment type will be explained.

The non-heat treatment type of method of production of a welded joint in the present invention, as illustrated in FIG. 1 or FIG. 2, is a method of production of a welded joint 10 (30) of a structure where, due to the structure of the welded joints or structure of the welded structure, welding is only possible from one side of the steel material 11 (31) of the welded joints 10 (30) and where the inside weld toes 21 which are covered by the welded structure 1 or the root parts 41 which are formed by partial penetration welding and which cannot be approached from the outside cannot be post-treated by mechanical means or welding. This method is provided with a first weld step which forms an inside weld toe 21 or root part 41 using a weld metal with a transformation start temperature of 175° C. to 400° C. in range, at least part of the weld metal forming the inside weld toe 21 or root part 41 which is formed at the first weld step becoming an unmelted part, and a second weld step which performs welding for building up the weld metal by a single pass by a weld heat input by which the unmelted part is heated until completely retransforming to austenite so as to introduce compressive residual stress to the inside weld toe 21 or root part 41.

In the above-mentioned non-heat treatment type of method, first, to prevent hot cracks, for the purpose of preventing the occurrence of butt solidified weld, as the first weld bead, a weld bead (inside weld toe and root part) is formed using a low temperature transformation weld material. This corresponds to the first weld step. This is a weld metal which was formed using a low temperature transformation weld material, so this weld metal is a low temperature transformation weld metal. Due to this weld bead, an inside weld toe or root part at the side which cannot be mechanically treated is formed. However, in this state, a sufficient amount of welding cannot be obtained, and the static strength of the joint is insufficient. Therefore, a second weld bead (outside weld toe) is formed as a succeeding bead. This corresponds to the second weld step. Regarding the formation of the second bead, it is possible to use a weld material commensurate with the strength of the steel plate using the welded structure, that is, an ordinary weld material. Further, it is possible to continue to use the low temperature transformation weld material. Note that, a material with a hot crack susceptibility is selected. In this sense, for formation of the second bead, it is preferable to use an ordinary weld material. Further, for persons in the welding field, selection of a weld material commensurate with the strength of the steel material is not particularly difficult.

In this way, a welded joint is formed by two-pass welding, but by just two-pass welding, the danger arises of the compressive residual stress which the first weld bead of the low temperature transformation weld material formed ending up being lost by the second bead. With this as is, no improvement of the fatigue strength can be expected. Therefore, at the time of performing the second weld step, after the first formed compressive residual stress is lost, it is necessary that compressive residual stress again be caused. The point of the second weld bead being used to cause compressive residual stress again is the technical idea forming the heart of the present invention. That is, the compressive residual stress for improving the fatigue strength is not the residual stress which occurred when welding using the low temperature transformation weld material, but residual stress which occurred when performing the second welding.

The utilization of the low temperature transformation weld material in the prior art is the art of utilization of expansion by transformation to introduce compressive residual stress, but this compressive residual stress occurs in the cooling process at the time of welding utilizing a low temperature transformation weld material. In the present invention, this compressive residual stress corresponds to the compressive residual stress occurring in the first pass of welding. In the present invention, this compressive residual stress ends up being lost in the second welding. The technical idea forming the heart of the present invention is again causing compressive residual stress at the time of second welding. Furthermore, the weld material which is used in the second welding is not necessarily limited to a low temperature transformation weld material.

To cause the formation of the residual stress of compression at an inside weld toe or root part where fatigue becomes an issue in the second weld step which uses a weld material which is not necessarily a low temperature transformation weld material, it is not possible to perform the second welding unrestrictedly. That is, it is necessary to control the effects due to the second welding. Specifically, to regenerate the residual stress of compression at the second weld step, it is necessary to again cause all of the low temperature transformation weld metal formed at the first welding to transform to austenite due to the heat effect by the second welding. Conversely, if it is possible to again cause complete transformation to austenite, it is possible to again cause expansion by transformation and again cause formation of compressive residual stress during the later cooling and as a result it is possible to achieve an improvement of the fatigue strength. If the second weld step causes only part of the low temperature transformation weld metal which was formed by the first welding to again transform to austenite, the unmelted part will just shrink by heat and will not expand by transformation in the subsequent cooling, so sufficient compressive residual stress cannot be again caused. Further, even if welding to simply cover the surface of the low temperature transformation weld metal which was formed by the first welding, it is not possible to cause all of the low temperature transformation weld metal which was formed by the first welding to again retransform to austenite.

In the second weld step, it is necessary that part or all of the low temperature transformation weld metal which was formed by the first welding be unmelted. If all of the low temperature transformation weld metal ends up being melted by the second welding, compressive residual stress can no longer be again introduced. On the other hand, all of the unmelted low temperature transformation weld metal has to be heated until again transforming to austenite in the final weld pass in the second weld step. Studying such conditions in advance is not particularly difficult for persons in the welding field. This is because by preparing in advance a test piece of the same shape as the actual welded joint and performing the first weld step and second weld step by the same weld material as the weld material which should be used when actually performing welding so as to fabricate a welded joint and, after that, taking a cross-sectional macro test piece from the welded joint, it is possible to easily judge if there is an unmelted part in the low temperature transformation weld metal and, furthermore, if the final weld pass in the second weld step enables all of the unmelted low temperature transformation weld metal to again transform to austenite if observing the structure of the cross-sectional macro test piece. It is sufficient to determine the welding conditions in advance in this way and performing welding of an actual welded joint under these conditions. The transformation start temperature of the low temperature transformation weld metal can be confirmed by taking a test piece from an unmelted low temperature transformation weld metal part of a welded joint fabricated in advance and measuring the transformation start temperature.

As described above, the joints such as shown in FIG. 1 or FIG. 2A are improved in fatigue strength.

Next, a T-joint which is welded from the two sides will be explained.

This case is the case such as shown in FIG. 2B. To improve the fatigue strength of the root parts, this is limited to the case where the weld metals present at two locations are sufficiently far apart. The first and the second weld steps for forming the weld metals should be performed so that the residual stress which was introduced by the other weld step is not caused to be lost. That is, if the weld metals present at the two sides are made to appear independent, it is possible to apply the already explained non-heat treatment type art to the weld step for forming the weld metals so as to improve the fatigue strength of the root parts. In FIG. 2B, as the joint, there is a single joint of a T-joint, but the present invention has as its object the control of the residual stress to improve the fatigue strength, so it is believed that even if the effect of each welding on the residual stress of the other can be ignored, there are weld zones which are welded from only one side present at two locations. In this case, the unwelded zone corresponds to a sealed off space sandwiched between two weld zones.

"Separated to an extent not having any effect on residual stress" is also dependent on the amount of weld heat input. If the amount of heat input is high, the thickness of the weld metal which was formed at the weld pass at that time also becomes larger, so in the present invention, the thickness of the weld metal was employed instead of the amount of heat input. In the present invention, the thickness of the weld metal is defined as shown in FIG. 3. First, one point A on the surface of the weld metal is determined. A tangent is drawn to the surface of the weld metal at this A, then a line perpendicularly intersecting this tangent and passing through the point A is found. The intersection of this line and the fusion line of the weld metal is determined as B. The distance between the point A and the point B is defined as the thickness at the point A. In this way, the thickness is defined by points of the weld metal. The maximum value is determined as the thickness of the weld metal. Note that, with this definition, if performing subsequent welding, the weld metal surface ends up being lost, so caution is required that it is necessary to determine the thickness before performing a subsequent welding pass after each welding pass. Further, when comparing the maximum value of the thickness of the weld metal formed at the different welding passes and the length of an unwelded zone, and the length of the unwelded zone is at least three times that maximum value, it is possible to deem the weld metals present at the two sides to be independent from each other. The inventors discovered that there is no effect on the residual stress. When the unwelded zone is shorter than this, sometimes the weld step at one side will affect the residual stress at the other side and therefore the fatigue strength will not necessarily be improved, so this value was set.

Next, a cross joint will be explained.

A cross joint may be considered T-joints formed welded at a single steel plate from the front side and back side. In this case, the limiting conditions for forming these T-joints have to satisfy the limiting conditions set when forming the T-joints. For a cross joint, in addition to these conditions, care is required regarding the welding heat which is conducted through the steel plate. In this case, the plate should be thick enough to an extent not affecting the residual stress. That is, when the length of the unwelded zone and the smallest plate thickness forming the cross joint are at least three times the maximum value of the thickness of the weld metal formed at the different welding passes, the newly formed weld metals can be deemed mutually independent. The inventors discovered that there is no effect on the residual stress. When the unwelded zone is shorter than this, the weld step at one side will affect the residual stress at the other side and sometimes the fatigue strength will not necessarily be improved, so this value was set.

The above is the technical idea of the present invention in the non-heat treatment type of method of improvement of the fatigue strength.

If the above transformation of the low temperature transformation weld metal is transformation by which the volume expands at a low temperature defined by the present invention, there is an advantageous effect even if not necessarily limited to a specific transformation, but in general the transformation which occurs in the temperature range of the present invention is martensite transformation. The transformation start temperature of martensite transformation differs from the case of bainite transformation or ferrite-pearlite transformation. There is the feature that it is determined by only the composition of the weld metal without being dependent on the cooling speed at the time of welding. Further, the formula for estimation using the composition is also known. For example, the following formula for estimation is proposed:

$$Ms = 719 - 795C - 20Cr - 32Ni - 35.6Si - 13.3Mn - 23.7Mo - 11.9Nb$$

Note that, Ms is the martensite transformation start temperature (° C.). C etc. shows the value of the composition of the weld metal (mass %). The presence of such a formula of estimation is a convenient indicator able to serve as a pointer for development of materials. Note that, the point where the transformation which occurs in the range of temperature of the present invention is mainly martensite transformation is the same in the heat treatment type explained next.

Next, the heat treatment type of method of improvement of the fatigue strength in the present invention will be explained.

The heat treatment type of method of production of a welded joint in the present invention is a method of producing such a welded joint or welded joint 10 (30) made a structure of a welded structure, which method is provided with a first weld step which applies welding which forms an inside weld toe 21 or root part 41 using a weld metal with a transformation start temperature of 175° C. to 400° C. in range, a second weld step which applies welding which builds up the weld metal by one pass or two or more passes so that at least part of the weld metal forming the inside weld toe 21 or root part 41 formed at the first weld step becomes an unmelted part, and a heat treatment step which, after that, performs heat treatment which makes the unmelted part of the weld metal which was formed at the first weld step completely retransform to austenite so as to introduce compressive residual stress at the inside weld toe 21 or root part 41.

In the non-heat treatment type of method, the second weld step is used to heat the low temperature transformation weld metal which was formed at the first weld step until transforming all of it to austenite. As the heat treatment type of method, when due to the shape of the joint, complete retransformation to austenite is difficult or otherwise when it cannot be judged that reliable compressive residual stress can be reintroduced, heat treatment is performed after welding. Due to this heat, the low temperature transformation weld metal part is reliably made to completely retransform to austenite. Therefore, if compared with the non-heat treatment type, the first weld step is the same as the heat treatment type. In the second weld step, it is the same up to the point where part of the low temperature weld metal which was formed at the first weld step is made the unmelted state. The weld material used does not necessarily have to be a low temperature transformation weld material. However, in the second weld step in the heat treatment type, it is not necessarily required that all or part of the unmelted part of the low temperature transformation weld material which was formed in the first weld step be retransformed to austenite by the final weld pass of the second weld step. The reason is that in the heat treatment step after the second weld step, all of the material is retransformed to austenite. That is, the heat treatment type of method of improvement of the fatigue strength in the present invention retransforms the low temperature transformation weld metal to austenite by the heat treatment after welding, so there is no need for retransformation to austenite before that.

Determining the welding conditions and heat treatment conditions of the heat treatment type of method of improvement of the fatigue strength in the present invention is not particularly difficult for a person in the welding field. In the same way as the non-heat treatment type, by preparing in advance a test piece of the same shape as the actual welded joint and performing the first weld step and second weld step by the same weld material as the weld material which should be used when actually performing welding, then treating the fabricated welded joint by a heat treatment step, then taking a cross-sectional macro test piece from the welded joint, it is possible to easily judge if there is an unmelted part in the low temperature transformation weld metal and, furthermore, if the heat treatment causes the unmelted low temperature transformation weld metal to again completely transform to austenite if observing the structure of the cross-sectional macro test piece. In this way, it is sufficient to determine the welding conditions or heat treatment conditions in advance and work the actual welded joint under these conditions. The transformation start temperature of the low temperature transformation weld metal can be confirmed by sampling a test piece from the unmelted low temperature transformation weld metal part of the welded joint fabricated in advance and measuring the transformation start temperature.

The above is the technical idea of the non-heat treatment type and the heat treatment type of method of improvement of the fatigue strength of the present invention. Note that, in the non-heat treatment type, when the second weld step is comprised of two or more passes, the final pass of the second weld step is separated from the weld metal which was formed at the first weld step, so the second weld step of the non-heat treatment type is preferably limited to the case of single-pass welding.

Reasons for Limitation of Method of Production of Welded Joint

Next, the reasons for limitation in the present invention will be explained.

"Transformation Start Temperature of Weld Metal Used in First Weld Step"

First, the reasons for limitation of the transformation start temperature of the low temperature transformation weld metal will be explained.

In the present invention, low temperature transformation weld metal is formed at the inside weld toe or root part where fatigue is a problem and where measures for improvement of fatigue strength by post-treatment by mechanical means or welding are not possible, and expansion by transformation of the low temperature transformation weld metal is used to introduce compressive residual stress to the weld toe or root part. For this reason, it is necessary to reduce the heat shrinkage after the end of transformation. The upper limit of the transformation start temperature of 400° C. was set because if a transformation start temperature is above this, the heat shrinkage after transformation becomes larger and the compressive stress which was introduced at the time of expansion by transformation ends up being lost. On the other hand, the lower limit of 175° C. was set because even if setting a transformation start temperature below this, the effect remains substantially the same and, further, to obtain a transformation start temperature below 175° C., it is necessary to add alloy element materials over the ranges of limitation of the present invention resulting in higher manufacturing cost of the weld material and furthermore an increased danger of occurrence of hot cracks.

"Heat Treatment Method in Heat Treatment Step"

Next, the heat treatment method in the heat treatment type will be explained.

As the method of heat treatment of a welded joint, heating by a gas burner, ohmic heating by an electric heater, placement of the structure as a whole in a heat treatment furnace, or other methods may be considered. In the present invention, a heat treatment method using ohmic heating or induction heating is preferable. Ohmic heating or induction heating greatly differs from heating by a gas burner or electric heater on the following points.

Ohmic heating is a method of running a current through a welded joint and using the Joule's heat produced at that time for heating, while induction heating is a method of generating an eddy current and using this for heating. The heat is generated inside of the welded joint. On the other hand, a gas burner etc. conveys heat from the joint surface to the inside of the joint by heat conduction. The present invention covers fatigue of the inside weld toe or root part where post-treatment by mechanical means or welding is not possible, so even in the case of performing heat treatment, direct heating by a gas burner etc. is not possible. Therefore, to cause the low temperature transformation weld metal to retransform to austenite by heat treatment, it is necessary to continue the heating until the heat is conducted to the low temperature transformation weld metal. For this reason, not only the low temperature transformation weld metal, but also the surrounding parts end up being considerably heated. This means that not only is the efficiency of the heat treatment poor, but also the danger arises of a large residual stress ending up being newly caused at the time of heat treatment. As opposed to this, ohmic heating and induction heating are internal heating, so there is little problem with the heat being conducted and the heat reaching the low temperature transformation weld metal. The problem of residual stress being newly created is smaller than with the case of heating by a gas burner etc. Accordingly, in the present invention, ohmic heating or induction heating is preferably used.

Composition of Weld Metal (Low Temperature Transformation): First Weld Step

Next, the reasons for limitation of the low temperature transformation composition of the weld metal used in the first weld step will be explained.

In the present invention, as the low temperature transformation weld metal, a system of composition based on Ni and a system of composition based on Cr and Ni are provided. In the present invention, the former is called the "Ni system" and the latter is caused the "Cr—Ni system".

Note that, in the following explanation, the "%" showing the contents of the composition indicates "mass %" unless otherwise indicated.

"Ni System of Composition"

First, the reasons for limitation of the ranges of composition will be explained for the Ni system.

(C: Carbon) 0.01 to 0.15%

C acts to lower the Ms temperature by addition to iron. However, on the other hand, excessive addition causes the problems of deterioration of the toughness of the weld metal and weld metal cracks, so the upper limit was made 0.15%. However, when C is not added, martensite is difficult to obtain. Further, it is necessary to reduce the residual stress by only other expensive elements. This cannot be said to be economical. C is limited to the case of addition of 0.01% or more as the minimum extent by which the economic merit is obtained utilizing the inexpensive element C. Note that, the upper limit of C is more preferably set to 0.10% from the viewpoint of weld metal cracks.

(Si: Silicon) 0.2 to 0.8%

Si is known as a deoxidizing element. Si has the effect of lowering the level of oxygen of the weld metal. In particular, in welding work, there is a danger of air entering during the welding, so it is extremely important to control the amount of Si to a suitable value. First, regarding the lower limit of Si, when the amount of Si is less than 0.2%, the amount of Si of the low temperature transformation weld material also becomes low. In this case, the deoxidation effect becomes reduced, the level of oxygen in the weld metal becomes too high, and there is a danger of causing deterioration of the mechanical properties, in particular the toughness. Therefore, in the present invention, the lower limit was made 0.2%. On the other hand, excessive addition of Si also causes deterioration of toughness, so the upper limit was made 0.8%.

(Mn: Manganese) 0.4 to 2.0%

Mn is known as an element which raises the strength. The lower limit of Mn of 0.4% was set as the minimum extent of value by which the effect of securing strength was obtained. On the other hand, with excessive addition, even if adding more, no particular improvement in fatigue strength can be expected, so the upper limit was set to 2.0%.

(P: Phosphorus) 0.03% or less (S: Sulfur) 0.02% or less

P and S are unavoidable impurities in the present invention. However, if these elements are present in large amounts in the weld metal, the toughness deteriorates, so the upper limits were made 0.03% and 0.02%.

(Ni: Nickel) 7.0 to 11.5%

Ni is, by itself, austenite, that is, a metal having a face-centered structure. It is an element which, by addition to the weld metal, makes the state of austenite a more stable state. Iron itself becomes an austenite structure at a high temperature region and becomes ferrite, that is, a body-centered structure at a low temperature region. Ni, by addition, makes the face-centered structure of iron in the high temperature region a more stable structure, so results in a body-centered structure in a lower temperature region than the case of non-addition. This means that the temperature of transformation to a body-centered structure becomes lower. The lower limit of 7.0% of Ni was determined in the sense of the minimum extent of amount of addition by which the effect of reduction of the residual stress appears. The upper limit of 11.5% of Ni was set because, from the viewpoint of reduction of the residual stress, even if adding more than this, there is not that much change in effect and, further, if adding more than this, the economic demerit arises of Ni being expensive and the danger of hot cracks arises. Note that, the lower limit of Ni reliably improves the fatigue strength, so it is more preferable to set this at 8.0%.

The above were the reasons for limitation of the essential composition of the Ni system in the present invention.

Note that, regarding the Ni system, it is possible to selectively add the following composition in accordance with need in addition to the above essential composition.

(Cu: Copper) 0.05 to 0.4%

Cu, when the weld material is a wire, has the effect of improving the conductivity if plated over this, so is an element which is effective for improving the welding work efficiency. However, excessive addition is not preferable industrially since the effect of improvement of the work efficiency becomes saturated and, furthermore, raises the wire manufacturing cost. The upper limit 0.4% of Cu was set for this reason. On the other hand, the lower limit 0.05% of Cu was set as the minimum extent of value by which the effect of improvement of the conductivity can be obtained.

(Nb: Niobium) 0.005 to 0.1%

Nb acts to bond with C in the weld metal and form carbides. Nb carbides act to raise the strength of the base material and the weld metal in small amounts. Therefore, the economic merits of effective utilization are large. However, on the other hand, excessive formation of carbides causes excessive precipitation hardening, so the upper limit is inherently set. The lower limit of Nb was set to 0.005% as the minimum value at which carbides can be formed and the effect of increase of strength can be expected. Further, the upper limit of Nb was made 0.1% because of the problem of weld cracks caused by the remarkable increase in strength and, even if the problem of weld cracks can be avoided, the effect of increase of strength becomes saturated.

(V: Vanadium) 0.01 to 0.5%

V is also an element which acts in the same way as Nb. However, unlike Nb, to expect the same effect of precipitation, it is necessary to increase the amount of addition over Nb. For this reason, the lower limit 0.01% of the addition of V was set as the minimum value at which precipitation hardening can be expected by addition. Further, the upper limit of V was made 0.5% because if adding more than this, the precipitation hardening becomes too remarkable, further, even if excessively adding this, the improvement from the viewpoint of increase of fatigue strength becomes saturated, and, furthermore, excessive precipitation hardening occurs, so the problem of weld cracks occurs.

(Ti: Titanium) 0.005 to 0.1%

Ti, like Nb and V, also forms carbides and causes precipitation hardening. However, in the same way as precipitation hardening of V differs from that of Nb, precipitation hardening of Ti differs from those of Nb and V. Therefore, the range of the amount of addition of Ti was also set to a range different from Nb and V. The lower limit 0.005% of the amount of addition of Ti was set as the minimum value by which this effect can be expected, while the upper limit of 0.1% of Ti was set because if adding over this, the effect of improvement of the fatigue strength becomes saturated and, further, an excessive precipitation effect causes the problem of cracks to occur.

(Cr: Chromium) 0.1 to 3.0%

Cr, like Nb, V, and Ti, is a precipitation hardening element. Further, Cr also has the effect of reduction of the Ms temperature and should be effectively used. However, the low temperature transformation weld metal in the present invention achieves a reduction of the Ms temperature mainly by the addition of Ni, so the amount of addition of Cr should be made smaller than Ni. Excessive addition of Cr does not necessarily improve the effect of reduction of the residual stress and, further, Cr is expensive, so this is not preferable industrially. The lower limit 0.1% of the amount of addition of Cr was set as the minimum extent of value by which the effect of reduction of residual stress is obtained by addition of this. Further, the upper limit 3.0% of the amount of addition of Cr was set because, for the Ni system, the Ms temperature is already reduced by the addition of Ni and the strength is secured by other precipitating elements, so even if adding more, there is not that much change in the effect of reduction of the residual stress.

(Mo: Molybdenum) 0.1 to 2.0%

Mo is also an element having an effect similar to Cr. However, Mo is an element by which greater precipitation hardening can be expected than Cr. Therefore, the range of addition was set narrower than Cr. The lower limit of 0.1% was set as the minimum extent of value at which the effect of addition of Mo can be expected. Further, the upper limit of 2.0% of Mo was set since even if adding more than this, the improvement in the fatigue strength becomes saturated.

The above were the reasons for limitation of composition in the Ni system of the present invention. Note that, for the Ni system, the transformation start temperature is mainly achieved by Ni, so from the viewpoint of prevention of hot cracks, it is preferable to set the lower limit of the transformation start temperature of the Ni system low temperature transformation weld metal to 200° C.

"Composition of Cr—Ni System"

Next, the reasons for limitation of the ranges of composition will be explained for the Cr—Ni system.

(C: Carbon) 0.005 to 0.10%

C, by addition to iron, acts to lower the Ms temperature. However, on the other hand, excessive addition causes the problem of weld cracks and the problem of deterioration of toughness. Further, in the Cr—Ni system in the present invention, addition of Cr and Ni considerably lowers the Ms temperature, so the upper limit of C should be set lower than the Ni system. For this reason, the upper limit of C in the Cr—Ni system was made 0.10% from the viewpoint of prevention of hot cracks and toughness. However, if C is not added, martensite is difficult to obtain. Further, it is necessary to reduce the residual stress by just other expensive elements, so this cannot be said to be economical. C was limited to addition of 0.005% or more to utilize the inexpensive element C and as the minimum extent of value at which the economic merit is obtained.

(Si: Silicon) 0.1 to 0.7%

Si is known as a deoxidizing element. In particular, in the weld metal, there is a danger of air entering during the welding, so it is extremely important to control the amount of Si to a suitable value. First, regarding the lower limit of Si, if the amount of Si of the low temperature transformation weld metal is less than 0.1%, it means that the amount of Si of the low temperature transformation weld material is also that much lower, the deoxidation effect is reduced, the level of oxygen in the low temperature transformation weld metal becomes too high, and there is the danger of causing deterioration of the mechanical properties, in particular the toughness. For this reason, the lower limit of the amount of Si of the low temperature transformation weld metal was made 0.1%. Note that, Si has the effect of improvement of the work efficiency at the time of welding in addition to a deoxidation effect, so it is more preferable to make the lower limit of Si 0.30%. On the other hand, even if adding over 0.7% of Si, the effect of improvement of the work efficiency becomes saturated, so the upper limit was made 0.7%.

(Mn: Manganese) 0.1 to 2.0%

Mn is generally use as an element which raises the strength, but in the Cr—Ni-based composition of the present invention, Cr etc. already give that effect. Therefore, Mn is added, in the same way as Si, mainly for the purpose of the deoxidation effect. The lower limit 0.1% of Mn was set as the value of the lowest limit at which the deoxidation effect is obtained. On the other hand, regarding the upper limit of 2.0%, the upper limit was set to 2.0% because even if adding more than this, the deoxidation effect becomes saturated.

(P: Phosphorus) 0.03% or less (S: Sulfur) 0.02% or less

P and S are unavoidable impurities in the present invention. However, if these elements are present in large amounts in the base material and the weld metal, the toughness is degraded, so the upper limits were respectively made 0.03% and 0.02%.

(Ni: Nickel) 4.0 to 8.0%

Ni is a metal which alone has an austenite, that is, face-centered structure. Iron itself becomes an austenite structure in the high temperature region and becomes ferrite, that is, a body-centered structure, in the low temperature region. Ni, by addition, makes the face-centered structure of iron in the high temperature region a more stable structure, so results in a face-centered structure in a lower temperature region than the case of non-addition. This means that the temperature of transformation to a body-centered structure becomes lower. Further, Ni has the effect, by addition, of improving the toughness of the weld metal. The lower limit 4.0% of the amount of addition of Ni in the Cr—Ni system low temperature transformation weld metal was determined from the viewpoint of the minimum extent of amount of addition at which the effect of reduction of the residual stress appears and of securing the toughness. The upper limit 8.0% of the amount of addition of Ni was set because in Cr system welding wire, addition of Cr explained next causes the Ms temperature to be reduced to a certain extent and because, from the viewpoint of reduction of the residual stress, addition of more than this does not result in much of a change in effect and, further, addition of more than this gives rise to economic demerits due to the high price of Ni.

(Cr: Chromium) 8.0 to 15.0%

Cr, unlike Ni, is a ferrite former. However, Cr, if added to iron, forms ferrite in the high temperature region, but forms austenite in the medium temperature region and furthermore again forms ferrite when the temperature becomes lower. In actuality, at the low temperature side, ferrite is generally not obtained: martensite is obtained. This is due to the fact that the advantage of adding Cr is the increase in the hardenability. That is, the martensite transformation due to the addition of Cr is advantageous in the point that it prevents ferrite transformation due to the increase in hardenability and in the point that the Ms temperature itself becomes lower. The range of addition of Cr where these two effects are satisfied while effectively utilizing the expansion by transformation for reducing the residual stress was set with a lower limit of 8.0%. Further, the upper limit 15.0% of the upper limit of Cr was set because if adding an amount over this, the transformation temperature becomes too low and the amount of expansion due to transformation becomes small, so the effect of improvement of the fatigue strength tends to decrease.

The above summarized the reasons for limitation of the essential composition of the Cr—Ni-system in the present invention.

The Cr—Ni-system composition in the present invention may have the following elements selectively added to them. The object of adding the following composition is not necessarily to improve the fatigue strength, but judgment of whether to add them may be easily determined by persons in the welding field.

(Cu: Copper) 0.05 to 0.4%

Cu, in the case where the low temperature transformation weld material is a wire, has the effect of improving the conductivity by being plated on it, so is an element which is effective for improving the welding work efficiency. The lower limit 0.05% of Cu was set because if the Cu in the low temperature transformation weld metal is less than this, the amount of Cu which is plated on the wire becomes that much lower. This is the lowest value required for improving work efficiency by increasing the conductivity. However, excessive addition of Cu not only has no effect of improvement of the work efficiency, but also raises the wire manufacturing costs, so is not preferable in industry. The upper limit 0.4% of Cu was set for such reasons. Note that, when the low temperature transformation weld material is a rod, plating by Cu is not particularly required. Whether or not to add Cu to the low temperature transformation weld material, since Cu is an optional element in the present invention, should be selected from the viewpoint of not only measures for improvement of the fatigue strength, but also the work efficiency. A person in the welding field could easily judge whether Cu should be added.

(Nb: Niobium) 0.005 to 0.1%

Nb bonds with C in the weld metal and forms carbides. Nb carbides act to raise the strength of the weld metal in small amounts. Therefore, the economic merit of effective utilization is large. However, on the other hand, excessive formation of carbides results in the strength becoming too high and the problem of weld cracks and deterioration of toughness occurring, so the upper limit is inherently set. The lower limit of Nb was set to 0.005% as the minimum value which forms carbides and by which the effect of increase of strength can be expected. Further, the upper limit of Nb was made 0.1% as the value preventing the problem of cracks and not impairing the reliability of the weld zone due to the deterioration of toughness.

(V: Vanadium) 0.05 to 0.5%

V is also an element which acts similarly to Nb. However, unlike Nb, to expect the same effect of precipitation, it is necessary to increase the amount of addition compared with Nb. The lower limit 0.01% of addition of V was set as the lowest value at which precipitation hardening can be expected by addition. The reason for setting the upper limit of V is the same as the case of Nb. If adding more, the precipitation hardening becomes too remarkable and a deterioration of toughness is caused. The upper limit was set to 0.5% from the viewpoint that excessive hardening causes weld cracks.

(Ti: Titanium) 0.005 to 0.1%

Ti, like Nb and V, forms carbides to cause precipitation hardening. However, in the same way as the precipitation hardening of V differs from that of Nb, the precipitation hardening of Ti also differs from Nb and V. Therefore, the range of the amount of addition of Ti is also set to a different range than Nb and V. The lower limit 0.005% of the amount of addition of Ti was determined as the lowest amount at which this effect can be expected, while the upper limit 0.1% was determined from the viewpoint of preventing deterioration of toughness and weld cracks due to excessive steel.

(Mo: Molybdenum) 0.1 to 2.0%

Mo, like Nb, V, and Ti, is also an element due to which precipitation hardening can be expected. However, Mo has to be added in an amount greater than Nb, V, and Ti in order to obtain effects similar to Nb, V, and Ti. The lower limit 0.1% of the amount of addition of Mo was set as the minimum value at which an increase in yield strength can be expected due to precipitation hardening. Further, the upper limit of 2.0% of Mo was set because even if adding more than this, the improvement of the fatigue strength becomes saturated.

"Post Treatment For Improving Fatigue Strength"

Next, the reasons for limitation of the measures for improvement of fatigue strength for an inside weld toe at the welded side will be explained.

The present invention relates to a method of improvement of the fatigue strength of an inside weld toe or root part for which mechanical treatment or other measures for improvement of fatigue strength cannot be applied. Therefore, the weld toe at the welded side is not necessarily covered by the present invention. However, in the case of fatigue cracks, if possible to improve the fatigue strength at a certain part, the fatigue strength at another part determines the fatigue strength of the joint as a whole. Therefore, the inventors considered that it would be industrially significant to improve the fatigue strength of the inside weld toe or root part at the side where measures for improvement of the fatigue strength by post-treatment by mechanical means or welding cannot be applied, then provide measures for improvement of the fatigue strength of the weld toe at the opposite side.

Measures for improvement of fatigue strength can be roughly divided into methods of reducing the residual stress and methods of easing the stress concentration. As one example of methods of reducing the residual stress, there is the method of uniformly heating the structure as a whole and then gradually cooling. However, with this method, the compressive residual stress which was introduced by the low temperature transformation weld metal with such effort ends up being lost, so while this can be said to be a measure for improvement of the fatigue strength, it cannot be applied without restriction. The present invention has to be limited to measures for improvement of the fatigue strength which do not affect the residual stress which the low temperature transformation weld metal introduced.

In the present invention, it is possible to employ the method of mechanical post-treatment comprising post-treating one or both of the outside weld toes 22 (42) at the two sides of the weld bead at the welded side formed in the second weld step (see reference numerals 22a, 22b, 42a, and 42b in FIGS. 1 and 2) by grinding or other machining so as to make the shape of the post-treated outside weld toes 22 (42) smoother than the as-welded state.

The method of post-treatment by grinding or other machining so as to make a weld toe smoother than the as-welded state is a method of easing the stress concentration which does not have much of an effect on the residual stress which the low temperature transformation weld metal introduced, so is a preferable method as a method of improvement of the fatigue strength which is applied to joints covered by the present invention.

Further, in the present invention, it is possible to employ the method of mechanical post-treatment comprising post-treating one or both of the outside weld toes 22 (42) at the two sides of the weld bead at the welded side by shot peening, ultrasonic peening, air peening, or other peening so as to work the shape of the post-treated outside weld toes 22 (42) to be smoother than the as-welded state and introduce compressive residual stress to the outside weld toes 22 (42).

A measure for improvement of fatigue strength by post-treatment by ultrasonic peening or other peening not only has the effect of easing stress concentration, but also introduces residual stress of compression at the treated parts, so the effect of improvement of the fatigue strength is greater than with the case of general grinding. Further, it does not have much of an effect on the residual stress which the low temperature transformation weld metal introduced, so is a preferable method as a method for improvement of the fatigue strength which is applied to joints which are covered by the present invention.

Further, in the present invention, it is possible to employ the method of post-treatment by welding comprising treating one or both of the outside weld toes 22 (42) at the two sides of the weld bead by TIG welding (TIG welding without weld material) not using a weld material so as to work the shape of the TIG welded outside weld toes 22 (42) to be smoother than the as-welded state.

TIG welding without weld material is a method which, without using a weld material, causes the surface of a joint to remelt by the heat of the weld arc and eases the stress concentration at the weld toes etc. In general, the method of applying heat to a welded joint may cause the compressive residual stress which was introduced by the low temperature transformation weld metal to end up being lost, so care is required in use. However, even if TIG welding without weld material is a method of applying heat, it is possible to achieve a sufficient easing of the stress concentration by a small amount of heat input, so this is a preferable method able to be applied to the joints covered by the present invention. Note that, in the method of improvement of the fatigue strength of the heat treatment type in the present invention, when applying this method, if performing TIG welding without weld material before heat treatment, the problem of loss of the compressive residual stress which was introduced by the low temperature transformation weld metal completely disappears, so in the case of the heat treatment type, it is desirable to perform treatment by TIG welding without weld material before heat treatment.

Further, in the present invention, it is possible to employ the method of post-treatment by welding comprising post-treating one or both of the outside weld toes 22 (42) of the two sides of the weld bead by forming a weld bead (cosmetic bead) of a weld metal made the same composition and transformation start temperature as the weld metal which was used in the first weld step so as to introduce compressive residual stress to the post-treated outside weld toes 22 (42).

The method of using a weld material the same as that forming the low temperature transformation weld metal in the first weld step to form a cosmetic bead to the weld toe at the welded side is a preferable method able to be applied to joints covered by the present invention so as to reduce the amount of welding and keep down the amount of heat administered to the welded joint. However, this method is a method which controls the residual stress. On the other hand, the above method of TIG welding without weld material giving the same heat to the joint is a method which eases the stress concentration. The techniques of improvement of the fatigue strength differ. Therefore, in the heat treatment type of method of improvement of the fatigue strength in the present invention, the method of TIG welding without weld material can be applied either before heat treatment or after heat treatment, but the method of forming a cosmetic bead has to be applied after heat treatment. This is because if forming the cosmetic bead before heat treatment, the compressive residual stress which the cosmetic bead forms at the time of heat treatment ends up being lost. If forming a cosmetic bead before heat treatment, at the time of heat treatment, it is necessary to set the heat treatment conditions so as to cause both the low temperature transformation weld metal and weld metal of the cosmetic bead formed at the time of the first weld step to retransform to austenite, but in this case, the range of heating becomes broader, so the danger of residual stress due to heat treatment or deformation being introduced increases. For this reason, in the present invention, when employing the heat treatment type of method of improvement of the fatigue strength, the cosmetic bead is preferably applied after heat treatment.

As explained above, according to the method of production of a welded joint of the present invention, even when there is an inside weld toe or root part for which direct mechanical treatment of a structure which cannot be heat treated by mechanical means or welding due to the problems in the structure of the welded joint or structure in the welded structure, it is possible to improve the fatigue strength of the welded joint, possible to improve the lifetime of the welded structure as a whole, or possible to repair an existing welded structure to enable prolongation of the lifetime of the welded structure, so the significance in industry is extremely great.

EXAMPLES

Below, examples of the method of production of a welded joint according to the present invention will be given to explain the present invention more specifically. However, the present invention is naturally not limited to the following examples and may be worked while suitably changed within an extent of consistency with the preceding and succeeding gist. These are all also included in the technical scope of the present invention.

Example 1

Example 1 is an example of a non-heating type measure for improving the fatigue strength.

Figure 4:
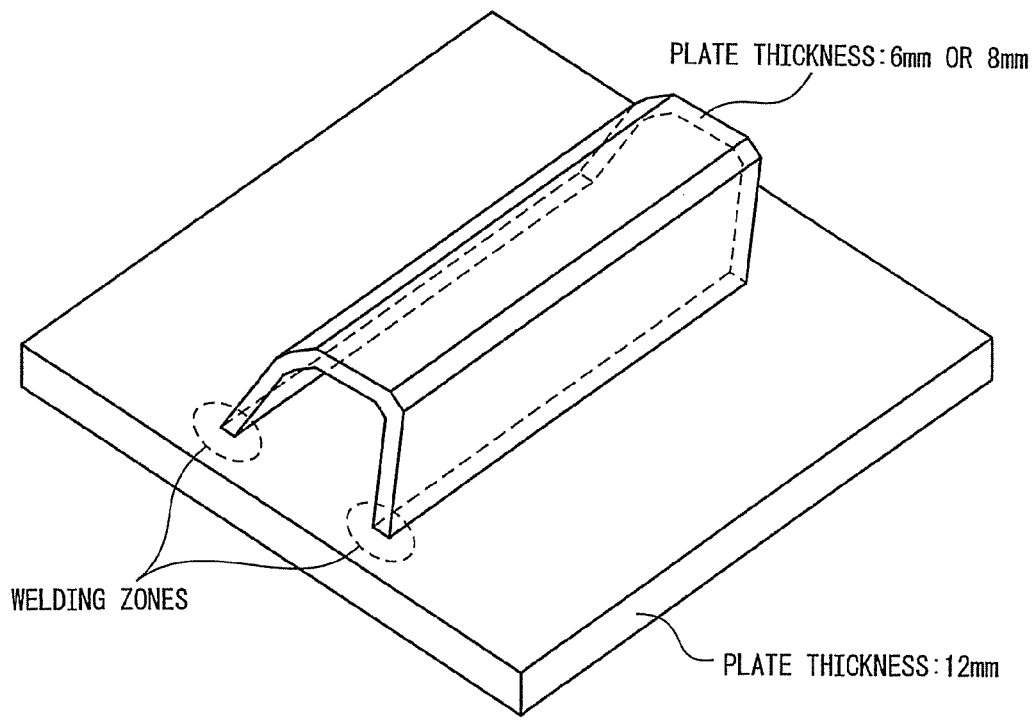
FIG. 4 is a schematic view for explaining one example of the method of production of a welded joint of the present invention and a view showing an example of a welded joint of a structure where the inside weld toes are structurally sealed off.
Figure 5:
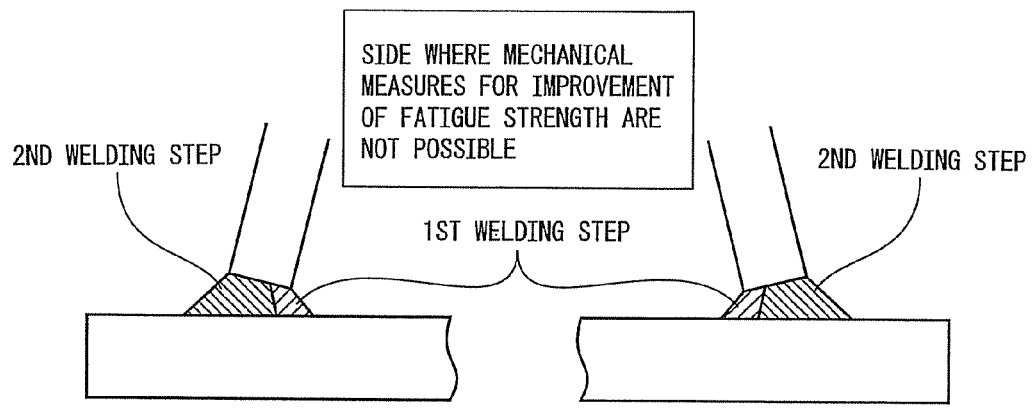
FIG. 5 is a schematic view for explaining one example of the method of production of a welded joint of the present invention and a partial enlarged cross-sectional view showing weld zones of the welded joints shown in FIG. 4.

First, as a structure which can only be welded from one side, a structure shown as shown in FIG. 4 was assembled by welding. The state of the weld zones at that time is the state such as shown in FIG. 5. In the case of the non-heating type, the number of welding passes is limited to two passes, so the plate thickness of the top part in FIG. 4 was set to 6 mm. Further, to produce the joints of FIG. 5, various weld materials were prepared. First, as the first weld step, beads were formed at the inside weld toes at the sides such as shown in FIG. 5 to which mechanical measures for improving the fatigue strength cannot be applied. After that, as the second weld step, weld beads (outside weld toes) of the second pass were prepared.

The weld method used was either of the two types of the shield metal arc welding method (SMAW) and gas metal arc welding method (GMAW). The welding conditions at that time were as follows:

First pass SMAW: 130 A-23V-14 cm/min
Second pass SMAW: 140 to 190 A-25 to 30V
First pass GMAW: 200 A-27V-23 cm/min
Second pass GMAW: 250 A-31V-18.5 cm/min Note that, regarding the welding conditions of the second pass SMAW, examples were also prepared for the case of retransformation or no retransformation and, furthermore, for the case where no unmelted part remains or when only part of the unmelted part transforms to austenite, so for the purpose of changing the amount of heat input, the above such ranges of current and voltage are selected and the welding speed is further controlled to change the amount of heat input. In the tables of examples shown later, for the second pass SMAW, the amount of heat input is described. Further, for the second pass weld material, sometimes the same weld material as the first pass is used and sometimes an ordinary weld material, that is, a weld material with a strength level of 490 MPa to 780 MPa in range, is selected. In either case, for the welding conditions, the above conditions were employed. Note that, the welding conditions of the second pass have a heat effect on the weld metal which was formed in the first pass. The objective is causing retransformation to austenite, so as long as this is achieved, the conditions are not limited to the above welding conditions. Further, as the ordinary weld material, ones of the following composition (composition of fused metal) were used:

490 MPa class SMAW: C: 0.07%, Si: 0.62%, Mn: 1.2%, P: 0.011%, S: 0.006%
490 MPa class GMAW: C: 0.10%, Si: 0.52%, Mn: 1.2%, P: 0.010%, S: 0.008%
590 MPa class SMAW: C: 0.07%, Si: 0.40%, Mn: 1.2%, P: 0.011%, S: 0.006%, Ni: 0.76%, Mo: 0.23%
590 MPa class GMAW: C: 0.07%, Si: 0.38%, Mn: 1.4%, P: 0.005%, S: 0.008%, Mo: 0.35%
780 MPa class SMAW: C: 0.05%, Si: 0.44%, Mn: 1.4%, P: 0.011%, S: 0.008%, Ni: 2.56%, Mo: 0.51%, Cr: 0.18%
780 MPa class GMAW: C: 0.07%, Si: 0.54%, Mn: 1.3%, P: 0.006%, S: 0.007%, Ni: 2.26%, Mo: 0.48%

As the weld material at this time, when using a weld material the same as the first weld step, when using a 590 MPa class weld material, etc. various ones were used. Further, several of such welded joints were fabricated. Part of these were used for analysis of the composition of the weld metal which was fabricated at first weld step, measurement of the transformation start temperature, and judgment of retransformation to austenite by observation of the microstructure, while the remainder were used as test pieces for fatigue tests.

Figure 6:
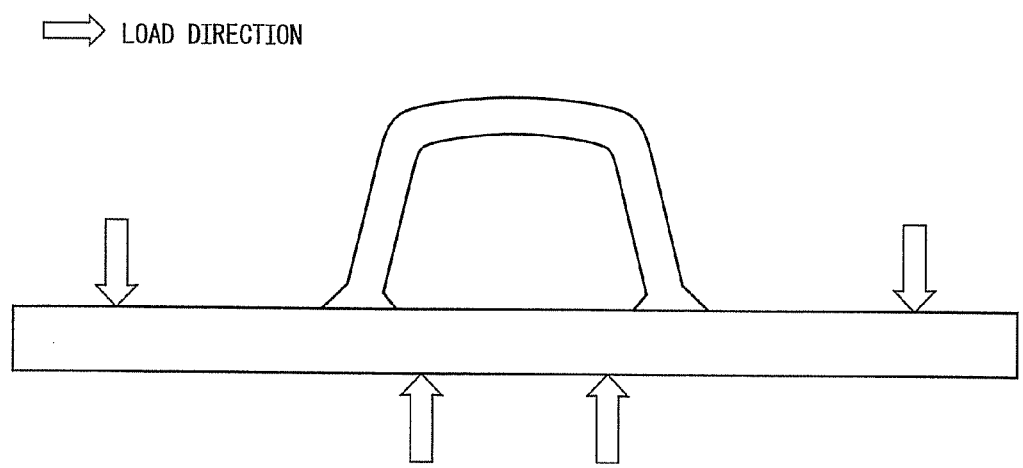
FIG. 6 is a schematic view for explaining one example of the method of production of a welded joint of the present invention and a cross-sectional view showing a load direction when performing a fatigue test in Example 1.

FIG. 6 is a schematic view showing a load direction when performing a fatigue test. The arrows in FIG. 6 show the load direction. The fatigue test is performed by a four-point bending test. The fatigue load was measured by attaching a strain gauge to the inside weld toe of the weld metal which was formed at the first weld step. Note that, a strain gauge was able to be attached because this was a test piece. In the case of an actual welded structure, measurement of stress by a strain gauge is believed difficult.

The following Table 1 shows the composition of the weld metal which was formed at the first weld step and the results of measurement of the transformation start temperature. The composition of the weld metal was measured by taking a test piece for use for direct analysis of the composition from the weld metal which was formed after welding. Further, for the transformation start temperature, the results obtained by taking a formastor test piece from the weld metal formed after welding and measuring it for transformation start temperature are shown. That is, a rod-shaped test piece was taken from the weld metal and heated and cooled. The length of the test piece was measured at each temperature to measure the expansion and shrinkage of the weld metal. The transformation start temperature was determined from this. In Table 1, Nos. 1 to 14 are examples where the composition and the transformation start temperature of the weld metal are within the scope of the present invention. The present invention relates to a method of improvement of the fatigue strength, so even if the composition and the transformation start temperature of the weld metal are within the scope of the present invention, an example is not necessarily an invention example. However, for reference, in the following Table 1, examples with composition and a transformation start temperature within the scope of the present invention are described as invention examples. As will be understood by viewing the composition of Nos. 1 to 14 in the following Table 1, the composition of the weld metal shown in the following Table 1 are examples relating to the composition of the Ni system in the present invention.

Further, in the following Table 1, Nos. 51 to 59 are examples outside the scope of the present invention. Some do not have the transformation start temperature described. Because cracks occurred in the weld metal, the transformation start temperature was measured by selecting a part where no cracks occurred to obtain a test piece. No. 51 had C of 0.20% or above the scope of the present invention. Weld cracks (hot cracks) occurred. No. 52 had Ni outside the scope of the present invention. In the same way as No. 51, weld cracks occurred. No. 56 had Nb outside the scope of the present invention. The strength became too high, so weld cracks (cold cracks) occurred. No. 57 had V outside the scope of the present invention. In the same way as No. 56, weld cracks occurred. No. 59 had Ti outside the scope of the present invention. In the same way as Nos. 56 and 57, weld cracks occurred. No. 59 had Si outside the scope of the present invention. No weld cracks occurred, but deoxidation was insufficient, so defects occurred.

Nos. 1 to 14 in the scope of the present invention were free of cracks and defects and had a transformation start temperature within the scope of the present invention. Note that, Nos. 53, 54, 55, and 58 of the comparative examples were free of cracks and other problems, but had composition outside the scope of the present invention, therefore also had a transformation start temperature outside the scope of the present invention. These evaluations should be judged from the results of the fatigue test.

TABLE 1

| No. | C | Si | Mn | P | S | Ni | Cr | Mo | Nb | V | Cu | Ti | Transformation start temperature (° C.) | Remarks |
|---|---|---|---|---|---|---|---|---|---|---|---|---|---|---|
| 1 | 0.02 | 0.30 | 1.8 | 0.012 | 0.008 | 11.3 | | | | | | | 307 | Inv. ex. |
| 2 | 0.14 | 0.70 | 0.43 | 0.010 | 0.006 | 7.2 | | | | | | | 347 | Inv. ex. |
| 3 | 0.10 | 0.55 | 1.85 | 0.011 | 0.009 | 8.3 | | | | | | | 330 | Inv. ex. |
| 4 | 0.05 | 0.45 | 0.85 | 0.009 | 0.005 | 9.3 | 2.5 | | | | | | 304 | Inv. ex. |
| 5 | 0.03 | 0.52 | 0.53 | 0.009 | 0.005 | 8.1 | | 1.8 | | | | | 368 | Inv. ex. |
| 6 | 0.04 | 0.48 | 0.65 | 0.010 | 0.006 | 10.9 | | | 0.018 | | | | 313 | Inv. ex. |
| 7 | 0.05 | 0.45 | 0.84 | 0.009 | 0.005 | 9.3 | | | | 0.4 | | | 355 | Inv. ex. |
| 8 | 0.12 | 0.25 | 1.25 | 0.011 | 0.012 | 8.2 | | | | | 0.26 | | 336 | Inv. ex. |
| 9 | 0.05 | 0.68 | 1.35 | 0.012 | 0.006 | 9.3 | | | | | | 0.015 | 340 | Inv. ex. |
| 10 | 0.08 | 0.51 | 1.21 | 0.009 | 0.005 | 8.8 | 0.5 | 0.4 | | | | | 320 | Inv. ex. |
| 11 | 0.07 | 0.49 | 0.73 | 0.010 | 0.007 | 10.5 | 0.3 | 0.2 | 0.007 | | 0.35 | | 289 | Inv. ex. |
| 12 | 0.04 | 0.32 | 0.45 | 0.016 | 0.008 | 11.2 | 1 | 0.45 | 0.012 | 0.25 | 0.22 | 0.022 | 281 | Inv. ex. |
| 13 | 0.05 | 0.45 | 0.8 | 0.009 | 0.006 | 9.3 | 2.5 | | | | | | 305 | Inv. ex. |
| 14 | 0.13 | 0.45 | 1.35 | 0.010 | 0.005 | 10.8 | 0.8 | 0.2 | | | | | 215 | Inv. ex. |
| 51 | 0.20 | 0.44 | 0.85 | 0.018 | 0.009 | 11.3 | | | | | | | 171 | Comp. ex. (cracks) |
| 52 | 0.14 | 0.59 | 0.59 | 0.011 | 0.008 | 13.4 | | | | | | | 150 | Comp. ex. (cracks) |
| 53 | 0.13 | 0.35 | 1.35 | 0.019 | 0.007 | 10.5 | 8.5 | | | | | | 79 | Comp. ex. |
| 54 | 0.02 | 0.48 | 0.55 | 0.016 | 0.010 | 6.8 | | | | | | | 461 | Comp. ex. |
| 55 | 0.15 | 0.34 | 1.82 | 0.019 | 0.008 | 11.5 | 4.5 | | | | | | 105 | Comp. ex. |
| 56 | 0.15 | 0.70 | 1.85 | 0.017 | 0.012 | 11.3 | | 0.8 | 0.18 | | | | 168 | Comp. ex. (cracks) |
| 57 | 0.14 | 0.65 | 1.65 | 0.018 | 0.007 | 10.9 | 0.3 | 1.5 | | 0.77 | | | 172 | Comp. ex. (cracks) |
| 58 | 0.005 | 0.45 | 0.45 | 0.015 | 0.009 | 8.1 | | | | | | | 434 | Comp. ex. |
| 59 | 0.15 | 0.53 | 1.33 | 0.021 | 0.018 | 11.4 | 0.75 | 1.3 | | | 0.30 | | 153 | Comp. ex. (cracks) |
| 60 | 0.15 | 0.06 | 0.63 | 0.014 | 0.008 | 11.2 | 0.92 | 1.9 | 0.04 | 0.2 | | | 167 | Comp. ex. (defects) |

The following Table 2, like Table 1, shows the composition and the transformation start temperature of the weld metal which was formed at the first weld step when fabricating a test piece such as shown in FIG. 4 by welded joints as shown in FIG. 5. Note that, in FIGS. 4 and 5, there are welded joints at the right and left, but the same welding conditions were used to fabricate the joints. In the following Table 2, Nos. 101 to 116 indicate weld metals in the scope of the present invention, but in the same way as Table 1, the present invention relates to a method of improvement of the fatigue strength, so even if the composition and the transformation start temperature of the weld metal are within the scope of the present invention, the examples are not necessarily invention examples. However, for reference, in the following Table 2, examples in which the composition and transformation start temperature are within the scope of the present invention are described as invention examples. Further, Nos. 151 to 162 are comparative examples in the present invention. Among these, Nos. 152, 155, 160, 161, and 162 are examples of occurrence of cracks and defects in the weld metal. The transformation start temperature was measured by selecting a part of the weld metal where no cracks occurred. The other comparative examples did not suffer from cracks etc., but the compositions of the weld metal were outside the scope of the present invention, so the transformation start temperature was outside the scope of the present invention.

The following Table 3 shows the fatigue strength when forming weld metal of the composition systems shown in Table 1 and Table 2 by the first weld step and applying a fatigue load as shown in FIG. 6. The fatigue strength at this time was determined as the range of stress at which no fracture occurs even when applying a fatigue load 2 million times. Note that, the range of stress is the value measured by attaching a strain gauge to the test piece near the weld metal side which was formed by the first pass of the welding before running the fatigue test. Here, a fatigue strength of 200 MPa means no fracture occurred even when applying a load repeatedly 2 million times in a range of stress of 0 to 200 MPa. The weld method at this time was selected from the two types of the SMAW (shield metal arc welding method) and GMAW (gas metal arc welding method). In the weld methods shown in the following Table 3, [1] means the first weld step, while [2] means the second weld step. The compositions of the weld metal formed at the first weld step are those of Table 1 and Table 2. The weld metal nos. for the joints ([1] weld metal no.) are shown in the following Table 3. Regarding the second weld step, the same weld metal as the first weld step is not necessarily used. Sometimes an ordinary 590 MPa class weld material is used. Further, for each joint, the weld metal which was used in the second weld step (weld material of [2]) is also shown in the following Table 3. Furthermore, the results of whether the weld metal which was formed at the first weld

TABLE 2

| | Chemical composition of weld metal in first weld metal (mass %) | | | | | | | | | | | | Transformation start temperature | |
|---|---|---|---|---|---|---|---|---|---|---|---|---|---|---|
| No. | C | Si | Mn | P | S | Ni | Cr | Mo | Nb | V | Cu | Ti | (° C.) | Remarks |
| 101 | 0.02 | 0.30 | 1.12 | 0.012 | 0.008 | 4.5 | 8.5 | | | | | | 363 | Inv. ex. |
| 102 | 0.04 | 0.45 | 1.23 | 0.010 | 0.006 | 5.3 | 12.5 | | | | | | 234 | Inv. ex. |
| 103 | 0.03 | 0.51 | 0.78 | 0.011 | 0.009 | 4.1 | 14.3 | | | | | | 248 | Inv. ex. |
| 104 | 0.01 | 0.25 | 0.44 | 0.009 | 0.005 | 4.5 | 13.6 | | | | | | 279 | Inv. ex. |
| 105 | 0.05 | 0.52 | 0.83 | 0.009 | 0.005 | 7.5 | 8.5 | | | | | | 239 | Inv. ex. |
| 106 | 0.03 | 0.48 | 0.65 | 0.010 | 0.006 | 6.3 | 12.2 | | | | | | 223 | Inv. ex. |
| 107 | 0.09 | 0.24 | 0.48 | 0.009 | 0.005 | 5.3 | 8.3 | | | | | | 296 | Inv. ex. |
| 108 | 0.04 | 0.36 | 1.36 | 0.011 | 0.009 | 5.9 | 10.7 | 1.8 | | | | | 210 | Inv. ex. |
| 109 | 0.02 | 0.13 | 0.58 | 0.012 | 0.011 | 5.3 | 12.7 | | 0.07 | | | | 265 | Inv. ex. |
| 110 | 0.03 | 0.35 | 0.76 | 0.012 | 0.009 | 4.8 | 13.3 | | | 0.35 | | | 252 | Inv. ex. |
| 111 | 0.04 | 0.35 | 0.89 | 0.016 | 0.007 | 5.9 | 10.8 | | | | 0.25 | | 257 | Inv. ex. |
| 112 | 0.03 | 0.72 | 0.25 | 0.016 | 0.008 | 4.8 | 12.0 | | | | | 0.08 | 272 | Inv. ex. |
| 113 | 0.07 | 0.45 | 1.23 | 0.009 | 0.006 | 5.3 | 10.5 | 0.5 | 0.03 | 0.21 | 0.22 | 0.04 | 239 | Inv. ex. |
| 114 | 0.03 | 0.41 | 1.03 | 0.010 | 0.005 | 7.2 | 12.2 | 0.4 | | | 0.20 | | 182 | Inv. ex. |
| 115 | 0.05 | 0.50 | 0.88 | 0.014 | 0.007 | 5.5 | 10.4 | | 0.08 | 0.31 | | | 264 | Inv. ex. |
| 116 | 0.04 | 0.58 | 0.73 | 0.017 | 0.006 | 4.9 | 12.3 | 0.4 | | | 0.20 | 0.07 | 244 | Inv. ex. |
| 151 | 0.14 | 0.45 | 1.69 | 0.009 | 0.005 | 7.1 | 12.4 | | | | | | 93 | Comp. ex. |
| 152 | 0.20 | 0.43 | 1.77 | 0.009 | 0.005 | 6.6 | 11.4 | | | | | | 81 | Comp. ex. (cracks) |
| 153 | 0.03 | 0.35 | 0.45 | 0.019 | 0.015 | 6.5 | 2.5 | | | | | | 419 | Comp. ex. |
| 154 | 0.02 | 0.45 | 0.55 | 0.019 | 0.015 | 3.0 | 8.4 | | | | | | 415 | Comp. ex. |
| 155 | 0.09 | 0.58 | 1.51 | 0.019 | 0.017 | 5.8 | 12.8 | 0.28 | | | | | 161 | Comp. ex. (cracks) |
| 156 | 0.05 | 0.51 | 1.12 | 0.019 | 0.008 | 7.5 | 16.8 | | | | | | 69 | Comp. ex. |
| 157 | 0.11 | 0.55 | 1.82 | 0.019 | 0.010 | 7.8 | 14.4 | | | | | | 49 | Comp. ex. |
| 158 | 0.01 | 0.48 | 0.25 | 0.019 | 0.009 | 4.0 | 8.0 | | | | | | 402 | Comp. ex. |
| 159 | 0.003 | 0.67 | 0.88 | 0.019 | 0.013 | 4.1 | 8.2 | | | | | | 489 | Comp. ex. |
| 160 | 0.06 | 0.06 | 0.88 | 0.019 | 0.011 | 7.1 | 13.2 | | | | | | 165 | Comp. ex. (defects) |
| 161 | 0.05 | 0.25 | 1.91 | 0.018 | 0.008 | 5.7 | 14.8 | | | 0.85 | | | 166 | Comp. ex. (cracks) |
| 162 | 0.09 | 0.33 | 1.70 | 0.014 | 0.009 | 4.9 | 14.2 | | | | 0.26 | | 171 | Comp. ex. (cracks) | step was retransformed to austenite when observed in a macro test are also shown in Table 3.

On the other hand, J101 to J111 are comparative examples. The transformation start temperatures were outside the scope

TABLE 3

| No. | Weld method [1] | Weld method [2] | [1] Weld metal no. | Welding material of [2] | Second pass heat input (kJ/mm) | Unmelted part[1] | Retransformation[2] | Fatigue strength (MPa) | Remarks |
|---|---|---|---|---|---|---|---|---|---|
| J1 | SMAW | SMAW | 1 | 590 MPa | 2.5 | Good | Good | 280 | Inv. ex. |
| J2 | GMAW | SMAW | 2 | 590 MPa | 2.5 | Good | Good | 260 | Inv. ex. |
| J3 | SMAW | GMAW | 3 | 590 MPa | 2.5 | Good | Good | 260 | Inv. ex. |
| J4 | SMAW | SMAW | 4 | 590 MPa | 2.5 | Good | Good | 290 | Inv. ex. |
| J5 | SMAW | SMAW | 5 | 590 MPa | 2.5 | Good | Good | 240 | Inv. ex. |
| J6 | SMAW | SMAW | 6 | 590 MPa | 2.5 | Good | Good | 280 | Inv. ex. |
| J7 | SMAW | SMAW | 7 | 590 MPa | 2.5 | Good | Good | 250 | Inv. ex. |
| J8 | SMAW | SMAW | 8 | 590 MPa | 2.5 | Good | Good | 240 | Inv. ex. |
| J9 | SMAW | SMAW | 9 | 590 MPa | 2.5 | Good | Good | 260 | Inv. ex. |
| J10 | SMAW | SMAW | 10 | 590 MPa | 2.5 | Good | Good | 270 | Inv. ex. |
| J11 | SMAW | SMAW | 11 | 590 MPa | 2.5 | Good | Good | 310 | Inv. ex. |
| J12 | SMAW | SMAW | 12 | 590 MPa | 2.5 | Good | Good | 330 | Inv. ex. |
| J13 | SMAW | SMAW | 13 | 590 MPa | 2.5 | Good | Good | 290 | Inv. ex. |
| J14 | SMAW | SMAW | 14 | 590 MPa | 2.5 | Good | Good | 340 | Inv. ex. |
| J15 | SMAW | SMAW | 101 | 590 MPa | 2.5 | Good | Good | 260 | Inv. ex. |
| J16 | SMAW | GMAW | 102 | 590 MPa | 2.5 | Good | Good | 310 | Inv. ex. |
| J17 | GMAW | SMAW | 103 | 590 MPa | 2.5 | Good | Good | 330 | Inv. ex. |
| J18 | SMAW | SMAW | 104 | 590 MPa | 2.5 | Good | Good | 290 | Inv. ex. |
| J19 | SMAW | SMAW | 105 | 590 MPa | 2.5 | Good | Good | 310 | Inv. ex. |
| J20 | SMAW | SMAW | 106 | 590 MPa | 2.5 | Good | Good | 320 | Inv. ex. |
| J21 | SMAW | SMAW | 107 | 590 MPa | 2.5 | Good | Good | 280 | Inv. ex. |
| J22 | SMAW | SMAW | 108 | 590 MPa | 2.5 | Good | Good | 330 | Inv. ex. |
| J23 | SMAW | SMAW | 109 | 590 MPa | 2.5 | Good | Good | 300 | Inv. ex. |
| J24 | SMAW | SMAW | 110 | 590 MPa | 2.5 | Good | Good | 310 | Inv. ex. |
| J25 | SMAW | SMAW | 111 | 590 MPa | 2.5 | Good | Good | 300 | Inv. ex. |
| J26 | SMAW | SMAW | 112 | 590 MPa | 2.5 | Good | Good | 310 | Inv. ex. |
| J27 | SMAW | SMAW | 113 | 590 MPa | 2.5 | Good | Good | 330 | Inv. ex. |
| J28 | SMAW | SMAW | 114 | 590 MPa | 2.5 | Good | Good | 350 | Inv. ex. |
| J29 | SMAW | SMAW | 115 | 590 MPa | 2.5 | Good | Good | 310 | Inv. ex. |
| J30 | SMAW | SMAW | 116 | 590 MPa | 2.5 | Good | Good | 300 | Inv. ex. |
| J31 | SMAW | SMAW | 1 | Same as [1] | 2.5 | Good | Good | 290 | Inv. ex. |
| J32 | SMAW | SMAW | 101 | Same as [1] | 2.5 | Good | Good | 270 | Inv. ex. |
| J33 | SMAW | SMAW | 1 | 490 MPa | 2.5 | Good | Good | 270 | Inv. ex. |
| J34 | SMAW | GMAW | 1 | 490 MPa | 2.5 | Good | Good | 270 | Inv. ex. |
| J35 | SMAW | SMAW | 1 | 780 MPa | 2.5 | Good | Good | 290 | Inv. ex. |
| J36 | SMAW | GMAW | 1 | 780 MPa | 2.5 | Good | Good | 280 | Inv. ex. |
| J101 | SMAW | SMAW | 53 | 590 MPa | 2.5 | Good | Good | 220 | Comp. ex. |
| J102 | SMAW | SMAW | 54 | 590 MPa | 2.5 | Good | Good | 190 | Comp. ex. |
| J103 | SMAW | SMAW | 55 | 590 MPa | 2.5 | Good | Good | 230 | Comp. ex. |
| J104 | SMAW | SMAW | 58 | 590 MPa | 2.5 | Good | Good | 210 | Comp. ex. |
| J105 | SMAW | SMAW | 151 | 590 MPa | 2.5 | Good | Good | 200 | Comp. ex. |
| J106 | SMAW | SMAW | 153 | 590 MPa | 2.5 | Good | Good | 190 | Comp. ex. |
| J107 | SMAW | SMAW | 154 | 590 MPa | 2.5 | Good | Good | 190 | Comp. ex. |
| J108 | SMAW | SMAW | 156 | 590 MPa | 2.5 | Good | Good | 220 | Comp. ex. |
| J109 | SMAW | SMAW | 157 | 590 MPa | 2.5 | Good | Good | 180 | Comp. ex. |
| J110 | SMAW | SMAW | 158 | 590 MPa | 2.5 | Good | Good | 200 | Comp. ex. |
| J111 | SMAW | SMAW | 159 | 590 MPa | 2.5 | Good | Good | 190 | Comp. ex. |
| J112 | SMAW | SMAW | 1 | 590 MPa | 1.8 | Good | Poor | 200 | Comp. ex. |
| J113 | SMAW | SMAW | 2 | 590 MPa | 1.4 | Good | Poor | 210 | Comp. ex. |
| J114 | SMAW | SMAW | 101 | 590 MPa | 1 | Good | Poor | 220 | Comp. ex. |
| J115 | SMAW | SMAW | 102 | 590 MPa | 0.9 | Good | Poor | 200 | Comp. ex. |
| J116 | SMAW | SMAW | 102 | 590 MPa | 4.5 | Poor | — | 200 | Comp. ex. |

[1]Case of unmelted part present at first pass as "Good", while case of no unmelted part present at first pass indicated as "Poor"
[2]Case of all of unmelted part of first pass transformed indicated as "Good", case of all of unmelted part of first pass not transformed indicated as "Poor", and case of no unmelted part present at first pass indicated as "—"

Nos. J1 to J36 of Table 3 are joints in the case where weld metals of composition and the transformation start temperature in the scope of the present invention were formed at the first weld step and where, furthermore, observation by a macro test piece showed that the weld metals were retransformed to austenite at the second weld step. As will be understood from Table 3, the fatigue strengths were over 250 MPa in all cases. J33 to J36 are cases where the strengths of the weld materials which were used in the second weld step were different from J1 to J32, but it was learned that retransformation of the weld metals which were formed at the first weld step was achieved, so the fatigue strengths were improved.

of the present invention, so the fatigue strengths did not reach 250 MPa. Among these, J101, J103, J105, J108, and J109 are joints where the weld metals of Nos. 53 and 55 of Table 1 and Nos. 151, 156, and 157 of Table 2 were formed at the first weld step and where the transformation start temperatures became lower than the scope of the present invention. These joints are considered examples where the transformation start temperature is too low and where sufficient amounts of expansion by transformation cannot be obtained, so the effect of improvement of the fatigue strength is insufficient. Conversely, J102, J104, J106, J107, J110, and J111 are joints where the weld metals of Nos. 153, 154, and 159 of Table 2 were formed at the first weld step and where the transformation start temperature became higher than the scope of the present invention. The reduction of the residual stress was considered insufficient. Furthermore, the four joints of J112 to J115 are joints which had a transformation start temperature of the low temperature transformation weld metals which were formed at the first weld step within the scope of the present invention, but for which macroscopic observation revealed the amounts of heat input of the second pass were small, so only parts of the unmelted parts of the low temperature transformation weld metals retransformed to austenite at the second weld step. In this case, the compressive residual stresses which were introduced at the first weld step were lost and compressive residual stresses were not introduced again at the second weld step, so the fatigue strengths failed to be improved. The comparative example of J116 is an example which had a transformation start temperature within the scope of the present invention, but where the amount of heat input of the second pass was unsuitable and there were no unmelted parts of the weld metal which was formed at the first pass, that is, everything ended up melting, and therefore an example where the fatigue strength was not improved.

From the above, in the case of the invention examples, an effect of improvement of the fatigue strength was confirmed in all cases. It became clear that the invention was significant industrially.

Example 2

Example 2 is an example relating to the heat treatment type of method of improvement of the fatigue strength of the present invention. In the heat treatment type of method in the present example, there are two welding passes in the second weld step, so the plate thickness of the top part in FIG. 3 was set to 8 mm or slightly thicker than Example 1 so as to enable two-pass welding. As the welding overall, a single pass was performed at the first weld step and two passes at the second weld step for a total of three passes. Further, as the heating method at the time of heat treatment, the two types of methods of induction heating and ohmic heating were selected from. The induction heating was performed by 20 kW and 2.0 kHz, while the ohmic heating was performed by running a 250 A current through the weld bead.

The following Table 4 shows the results of Example 2. In the following Table 4, the meanings of [1] and [2] of the weld methods, [1] Weld metal no., and Weld material of [2] are the same as in Table 3. However, retransformation was judged, unlike the case of Example 1, by performing heat treatment, then judging if heat treatment caused retransformation. Further, the fatigue test was run by the same method as Example 1. The range of stress where no fracture occurred by 2 million cycles was made the fatigue strength. In the following Table 4, Nos. J201 to J230 are invention examples when using 590 MPa class weld materials and using induction heating for heat treatment in the second weld step. They had fatigue strengths all above 250 MPa. Further, J231 and J232 are invention examples when using the same weld material in the first weld step at the second weld step. It was learned that there is an effect of improvement of the fatigue strength. Further, J232 to J235 are invention examples in which ohmic heating was used for heat treatment. An effect of improvement of the fatigue strength was observed. J236 to J239 had weld metals which were formed at the first weld step the same as J201, but had strengths of the weld materials used in the second weld step of 490 MPa and 780 MPa or different from J201. However, retransformation of the weld metals which were formed in the first weld step due to induction heating was reliably achieved, so the fatigue strengths exceeded 250 MPa and an effect of improvement of strength was confirmed.

TABLE 4

| No. | Weld method [1] | Weld method [2] | [1] Weld metal no. | Weld material of [2] | Heating method | Unmelted part[1] | Retransformation[2] | Fatigue strength (MPa) | Remarks |
| --- | --- | --- | --- | --- | --- | --- | --- | --- | --- |
| J201 | SMAW | SMAW | 1 | 590 MPa | Induction heating | Good | Good | 270 | Inv. ex. |
| J202 | GMAW | SMAW | 2 | 590 MPa | Induction heating | Good | Good | 270 | Inv. ex. |
| J203 | SMAW | GMAW | 3 | 590 MPa | Induction heating | Good | Good | 260 | Inv. ex. |
| J204 | SMAW | SMAW | 4 | 590 MPa | Induction heating | Good | Good | 280 | Inv. ex. |
| J205 | SMAW | SMAW | 5 | 590 MPa | Induction heating | Good | Good | 250 | Inv. ex. |
| J206 | SMAW | SMAW | 6 | 590 MPa | Induction heating | Good | Good | 270 | Inv. ex. |
| J207 | SMAW | SMAW | 7 | 590 MPa | Induction heating | Good | Good | 250 | Inv. ex. |
| J208 | SMAW | SMAW | 8 | 590 MPa | Induction heating | Good | Good | 240 | Inv. ex. |
| J209 | SMAW | SMAW | 9 | 590 MPa | Induction heating | Good | Good | 260 | Inv. ex. |
| J210 | SMAW | SMAW | 10 | 590 MPa | Induction heating | Good | Good | 270 | Inv. ex. |
| J211 | SMAW | SMAW | 11 | 590 MPa | Induction heating | Good | Good | 300 | Inv. ex. |
| J212 | SMAW | SMAW | 12 | 590 MPa | Induction heating | Good | Good | 340 | Inv. ex. |
| J213 | SMAW | SMAW | 13 | 590 MPa | Induction heating | Good | Good | 280 | Inv. ex. |
| J214 | SMAW | SMAW | 14 | 590 MPa | Induction heating | Good | Good | 330 | Inv. ex. |
| J215 | SMAW | SMAW | 101 | 590 MPa | Induction heating | Good | Good | 260 | Inv. ex. |
| J216 | SMAW | GMAW | 102 | 590 MPa | Induction heating | Good | Good | 310 | Inv. ex. |
| J217 | GMAW | SMAW | 103 | 590 MPa | Induction heating | Good | Good | 340 | Inv. ex. |
| J218 | SMAW | SMAW | 104 | 590 MPa | Induction heating | Good | Good | 270 | Inv. ex. |
| J219 | SMAW | SMAW | 105 | 590 MPa | Induction heating | Good | Good | 290 | Inv. ex. |
| J220 | SMAW | SMAW | 106 | 590 MPa | Induction heating | Good | Good | 320 | Inv. ex. |
| J221 | SMAW | SMAW | 107 | 590 MPa | Induction heating | Good | Good | 300 | Inv. ex. |
| J222 | SMAW | SMAW | 108 | 590 MPa | Induction heating | Good | Good | 310 | Inv. ex. |
| J223 | SMAW | SMAW | 109 | 590 MPa | Induction heating | Good | Good | 290 | Inv. ex. |
| J224 | SMAW | SMAW | 110 | 590 MPa | Induction heating | Good | Good | 310 | Inv. ex. |
| J225 | SMAW | SMAW | 111 | 590 MPa | Induction heating | Good | Good | 310 | Inv. ex. |
| J226 | SMAW | SMAW | 112 | 590 MPa | Induction heating | Good | Good | 330 | Inv. ex. |
| J227 | SMAW | SMAW | 113 | 590 MPa | Induction heating | Good | Good | 320 | Inv. ex. |
| J228 | SMAW | SMAW | 114 | 590 MPa | Induction heating | Good | Good | 340 | Inv. ex. |
| J229 | SMAW | SMAW | 115 | 590 MPa | Induction heating | Good | Good | 320 | Inv. ex. |
| J230 | SMAW | SMAW | 116 | 590 MPa | Induction heating | Good | Good | 300 | Inv. ex. |
| J231 | SMAW | SMAW | 1 | Same as [1] | Induction heating | Good | Good | 280 | Inv. ex. |
| J232 | SMAW | SMAW | 101 | Same as [1] | Induction heating | Good | Good | 280 | Inv. ex. |

TABLE 4-continued

| No. | Weld method [1] | Weld method [2] | [1] Weld metal no. | Weld material of [2] | Heating method | Unmelted part[1] | Retransformation[2] | Fatigue strength (MPa) | Remarks |
|---|---|---|---|---|---|---|---|---|---|
| J233 | SMAW | SMAW | 1 | 590 MPa | Ohmic heating | Good | Good | 270 | Inv. ex. |
| J234 | GMAW | SMAW | 2 | 590 MPa | Ohmic heating | Good | Good | 270 | Inv. ex. |
| J235 | SMAW | SMAW | 101 | 590 MPa | Ohmic heating | Good | Good | 260 | Inv. ex. |
| J236 | SMAW | SMAW | 1 | 490 MPa | Induction heating | Good | Good | 250 | Inv. ex. |
| J237 | SMAW | GMAW | 1 | 490 MPa | Induction heating | Good | Good | 260 | Inv. ex. |
| J238 | SMAW | SMAW | 1 | 780 MPa | Induction heating | Good | Good | 280 | Inv. ex. |
| J239 | SMAW | GMAW | 1 | 780 MPa | Induction heating | Good | Good | 270 | Inv. ex. |
| J301 | SMAW | SMAW | 53 | 590 MPa | Induction heating | Good | Good | 230 | Comp. ex. |
| J302 | SMAW | SMAW | 54 | 590 MPa | Induction heating | Good | Good | 200 | Comp. ex. |
| J303 | SMAW | SMAW | 55 | 590 MPa | Induction heating | Good | Good | 220 | Comp. ex. |
| J304 | SMAW | SMAW | 58 | 590 MPa | Induction heating | Good | Good | 210 | Comp. ex. |
| J305 | SMAW | SMAW | 151 | 590 MPa | Induction heating | Good | Good | 210 | Comp. ex. |
| J306 | SMAW | SMAW | 153 | 590 MPa | Induction heating | Good | Good | 200 | Comp. ex. |
| J307 | SMAW | SMAW | 154 | 590 MPa | Induction heating | Good | Good | 190 | Comp. ex. |
| J308 | SMAW | SMAW | 156 | 590 MPa | Induction heating | Good | Good | 210 | Comp. ex. |
| J309 | SMAW | SMAW | 157 | 590 MPa | Induction heating | Good | Good | 190 | Comp. ex. |
| J310 | SMAW | SMAW | 158 | 590 MPa | Induction heating | Good | Good | 200 | Comp. ex. |
| J311 | SMAW | SMAW | 159 | 590 MPa | Induction heating | Good | Good | 180 | Comp. ex. |
| J312 | SMAW | SMAW | 1 | 590 MPa | Induction heating | Good | Poor | 190 | Comp. ex. |
| J313 | SMAW | SMAW | 2 | 590 MPa | Induction heating | Good | Poor | 220 | Comp. ex. |
| J314 | SMAW | SMAW | 101 | 590 MPa | Induction heating | Good | Poor | 210 | Comp. ex. |
| J315 | SMAW | SMAW | 102 | 590 MPa | Induction heating | Good | Poor | 200 | Comp. ex. |
| J316 | SMAW | SMAW | 1 | 590 MPa | Induction heating | Poor | — | 200 | Comp. ex. |

[1]Case of unmelted part present at first pass as "Good", while case of no unmelted part present at first pass indicated as "Poor"
[2]Case of all of unmelted part of first pass transformed indicated as "Good", case of all of unmelted part of first pass not transformed indicated as "Poor", and case of no unmelted part present at first pass indicated as "—"

J301 to J315 of Table 4 are comparative examples in the present invention. The fatigue strengths, unlike the invention examples, did not reach 250 MPa. Among these, J301, J303, J305, J308, and J309 had a transformation start temperature of the weld metals which were formed at the first weld step lower than the scope of the present invention and insufficient expansion by transformation, so it is believed reduction of the residual stress was insufficient. On the other hand, J302, J304, J306, J307, J310, and J311 had a transformation start temperature of the weld metals which were formed at the first weld step higher than the scope of the present invention, so it is believed the effect of reduction of the residual stress itself was small. Note that, J312 to J315 had a transformation start temperature of the low temperature transformation weld metals within the scope of the present invention, but the heat treatments were insufficient and only parts of the unmelted parts were retransformed to austenite, so no improvement in the fatigue strengths could be confirmed. The final Comparative Example J316 of Table 4 is an example where the weld metal of the first pass ended up completely melting in the second pass of welding and where the unmelted part ended up being lost. Therefore, the fatigue strength failed to be improved.

Above, in the case of the invention examples, the effect of improvement of the fatigue strength was confirmed in all cases. It became clear that the invention is industrially significant.

Example 3

Example 3 in the present invention is an example in the case of post-treating the outside weld toe of the weld metal which was formed in the second weld step as a measure for improving the fatigue strength.

Figure 7:
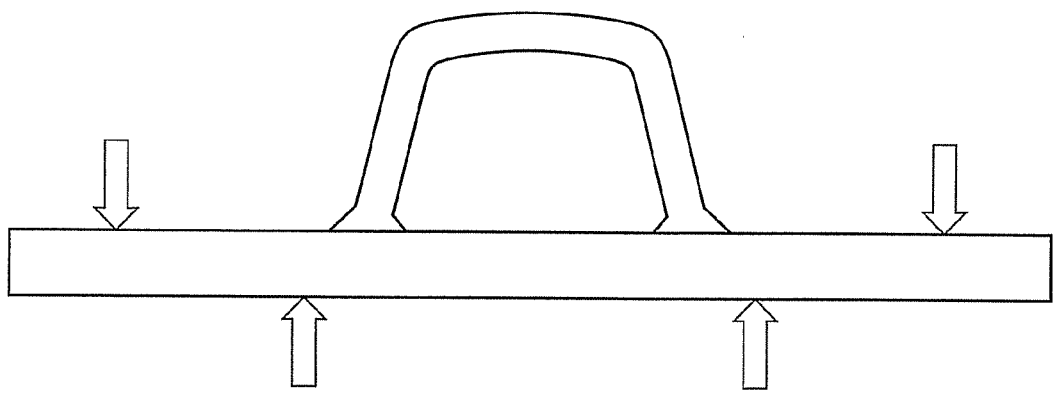
FIG. 7 is a schematic view for explaining one example of the method of production of a welded joint of the present invention and a cross-sectional view showing a load direction when performing a fatigue test in Example 3.

In Example 1 and Example 2, the fatigue strength at the weld metal side which was formed in the first weld step was made the issue, so the fatigue test, as shown in FIG. 6, narrowed the distance between the inside two support points in the four-point bending test and made the stresses at the weld metal toe parts formed in the first weld step and second weld step different. As opposed to this, in Example 3, the same level of stress acts, so as shown in FIG. 7, the positions of the two inside support points in the four-point bending test were made outside of the welded joints. Further, the stress was measured by attaching a strain gauge. Note that, the arrows in FIG. 7 show the load direction.

The measure for improvement of the fatigue strength applied to the outside weld toe of the weld metal formed at the second weld step may be any of shot peening, TIG welding without weld material, ultrasonic peening, formation of low temperature transformation weld metal, grinding, and removal of stress due to local heating. Note that, the weld metal used for formation of the low temperature transformation weld metal was the same as the weld material which was used in the first weld step. Amdng these measures, shot peening, ultrasonic peening, and formation of low temperature transformation weld metal are methods of introducing compressive residual stress. Among these, the above two further have the effect of improvement of the toe shape. Further, TIG welding without weld material and grinding are methods of improving the toe shape to ease the stress concentration. The removal of stress by the final local heating is the method of eliminating the tensile residual stress of the weld zone and simultaneously has the danger of the compressive residual stress which was introduced in the first weld step also being lost. These are comparative examples in the present invention.

The following Table 5 shows the results of Example 3. The joint nos. in the following Table 5 correspond to the joint nos. in Table 3. This means that measures for improvement of the fatigue strength were applied to the joints at the outside weld toes at the second weld step side. Further, the methods of treatment shown in the following Table 5 are methods of improvement of fatigue strength at that time. Further, at the "position of occurrence of fatigue cracks" in the following Table 5, [1] means occurrence of a fatigue crack at the inside weld toe at the first weld step side, while [2] means occurrence at the outside weld toe at the second weld step side.

TABLE 5

| No. | Joint no. | Treatment method | Fatigue strength | Position of occurrence of fatigue cracks | Remarks |
|---|---|---|---|---|---|
| K1 | J1 | Shot peening | 290 | [1] | Inv. ex. |
| K2 | J1 | TIG welding without weld metal | 280 | [2] | Inv. ex. |
| K3 | J1 | Ultrasonic peening | 280 | [1] | Inv. ex. |
| K4 | J1 | Grinding | 270 | [2] | Inv. ex. |
| K51 | J1 | SR by local heating | 210 | [1] | Comp. ex. |
| K101 | J28 | Shot peening | 340 | [1] | Inv. ex. |
| K102 | J28 | TIG welding without weld metal | 280 | [2] | Inv. ex. |
| K103 | J28 | Ultrasonic peening | 350 | [1] | Inv. ex. |
| K104 | J28 | Grinding | 270 | [2] | Inv. ex. |
| K151 | J28 | SR by local heating | 200 | [1] | Comp. ex. |

In Table 5, Nos. K1 to K5 and K101 to K105 are invention examples, while K51 and K151 are comparative examples. K1 had a fatigue strength of 290 MPa or substantially the same value as J1 of Table 3. Further, the position of crack occurrence was [1]. This is believed because due to the shot peening, the fatigue strength of [2] became higher than [1]. A similar trend was also observed in Nos. K3 and K4. Further, Nos. K2 and K5 had fatigue cracks occurring at [2]. The fatigue strengths were believed lower at [2] than [1], but the fatigue strengths themselves were substantially the same as J1 of Table 3, so in these cases, [1] and [2] are believed to be substantially the same in fatigue strength. A similar trend as this was also observed in K101 to K105.

K51 and K151 are examples of stress removal, that is, SR, by local heating. The heating method was heating using a gas burner. In this case, the fatigue strength did not reach 250 MPa. Further, the fatigue cracks occurred at the [1] side, that is, from the inside weld toes at which the low temperature transformation weld metals were formed. In this example, the fatigue strengths became lower than those of Table 3 shown in Example 1 (280 MPa in J1 joint and 350 MPa in J28 joint). The reason is believed to be that the compressive residual stress which was introduced at the first weld step side by local heating end up being lost due to the local heating.

Example 4

Example 4 is an example of a non-heating type of measure for improvement of the fatigue strength. The point of difference from Example 1 is that this is an example for the case of three or more welding passes.

In Example 4, the weld method employed was the SMAW. For the test piece fabricated at this time, in the same way as Example 2, a structure shown in FIG. 4 was employed. The plate thickness of the top part was made the same 8 mm as in Example 2. The first two passes of welding were performed using a 3.2 mm diameter welding rod. The compositions of the weld metal at that time were as shown in Table 6. As shown in Table 6, four types of two-pass welding were performed. The welding conditions were, in each pass, 120 A-22V-25 cm/min.

Next, these four types of joints were welded by the third pass. For the third pass of welding, the amount of heat input was changed. To view the effects, for an amount of heat input of 1.5 kJ/mm or more, a welding rod of 4 mm diameter was employed, while for an amount less than that, one of 3.2 mm was employed. The welding conditions were 170 A-25V in the case of a 4 mm rod diameter and 120 A-22V in the case of 3.2 mm. The welding speed was changed to adjust the amount of heat input. As a result, the number of welding passes of the joints used in Example 4 was three passes or corresponding to the case of a greater number of passes than the two-pass welding shown in Example 1.

Table 7 shows the results of fatigue tests on test pieces fabricated in this way. In Table 7, L1 to L8 are invention examples, while L51 to L55 are comparative examples. The amounts of heat input shown in Table 7 are the amounts of heat input of the third pass. Whether weld metal of a first pass retransformed by this third pass of welding was judged by taking a macro test piece from the test piece joint and examining the microstructure. As will be understood from Table 7, in the invention examples, it was confirmed that the weld metal of the first pass retransformed in all cases. On the other hand, in Comparative Examples L51 to L55, the amounts of heat input were low, so only parts of the weld metals of the first pass retransformed. In Comparative Example L56, the amount of heat input was large, so the unmelted part disappeared. The fatigue test was run by the load method shown in FIG. 5, but in the invention examples, as shown in Table 7, the results were all 250 MPa or more. As will be understood from a comparison with the comparative examples, there were clear improvements of the fatigue strengths. In Comparative Examples L51 to L55, even if the composition of the weld metals of the first pass and the second pass are the same, when the amounts of heat input of the third pass of welding are unsuitable, that is, when complete retransformation of the weld metals of the first pass is not achieved, it is clear that the fatigue strengths are not necessarily improved. The final Comparative Example L56 of Table 7 is an example where the weld metal of the first pass ends up completely melting by the third pass of welding and therefore the unmelted part ends up being lost and the fatigue strength was not improved.

TABLE 6

| No. | Pass no. | C | Si | Mn | P | S | Ni | Cr | Mo | Nb | V | Cu | Ti | Transformation start temperature (° C.) | Remarks |
|---|---|---|---|---|---|---|---|---|---|---|---|---|---|---|---|
| 1 | 1 | 0.03 | 0.30 | 1.6 | 0.011 | 0.008 | 11.1 | | | | | | | 325 | Inv. ex. |
| | 2 | 0.14 | 0.65 | 0.53 | 0.010 | 0.006 | 7.6 | | | | | | | 333 | |
| 2 | 1 | 0.04 | 0.26 | 0.47 | 0.012 | 0.007 | 10.7 | 0.8 | 0.5 | 0.01 | 0.21 | 0.18 | 0.017 | 304 | Inv. ex. |
| | 2 | 0.05 | 0.45 | 0.85 | 0.009 | 0.005 | 9.3 | 2.5 | | | | | | 310 | |
| 3 | 1 | 0.04 | 0.25 | 1.45 | 0.005 | 0.003 | 10.7 | 0.2 | | | | | | 328 | Inv. ex. |
| | 2 | 0.08 | 0.48 | 1.52 | 0.010 | 0.006 | 0.7 | | | | | | | 710 | |
| 4 | 1 | 0.03 | 0.41 | 0.71 | 0.008 | 0.004 | 7.0 | 13.4 | | | | | | 182 | Inv. ex. |
| | 2 | 0.12 | 0.25 | 1.25 | 0.011 | 0.012 | 8.2 | | | | | 0.26 | | 349 | |

TABLE 7

| No. | Welded joint before final pass (1 or 2 passes) | Amount of heat input of final pass (3rd pass) | Weld material of final pass | Unmelted part[1] | Retransformation[2] | Fatigue strength (MPa) | Remarks |
|---|---|---|---|---|---|---|---|
| L1 | 1 | 2.5 kJ/mm | 590 MPa | Good | Good | 270 | Inv. ex. |
| L2 | 2 | 2.5 kJ/mm | 590 MPa | Good | Good | 250 | Inv. ex. |
| L3 | 3 | 2.5 kJ/mm | 590 MPa | Good | Good | 260 | Inv. ex. |
| L4 | 4 | 2.5 kJ/mm | 590 MPa | Good | Good | 280 | Inv. ex. |
| L5 | 1 | 2.1 kJ/mm | 590 MPa | Good | Good | 250 | Inv. ex. |
| L6 | 2 | 2.3 kJ/mm | 590 MPa | Good | Good | 270 | Inv. ex. |
| L7 | 3 | 3.0 kJ/mm | 590 MPa | Good | Good | 270 | Inv. ex. |
| L8 | 4 | 1.6 kJ/mm | 590 MPa | Good | Good | 260 | Inv. ex. |
| L51 | 1 | 1.2 kJ/mm | 590 MPa | Good | Poor | 200 | Comp. ex. |
| L52 | 2 | 1.0 kJ/mm | 590 MPa | Good | Poor | 190 | Comp. ex. |
| L53 | 3 | 1.2 kJ/mm | 590 MPa | Good | Poor | 180 | Comp. ex. |
| L54 | 4 | 0.9 kJ/mm | 590 MPa | Good | Poor | 200 | Comp. ex. |
| L55 | 4 | 0.8 kJ/mm | 590 MPa | Good | Poor | 190 | Comp. ex. |
| L56 | 1 | 5.0 kJ/mm | 590 MPa | Poor | — | 190 | Comp. ex. |

[1]Case of unmelted part present at first pass as "Good", while case of no unmelted part present at first pass indicated as "Poor"
[2]Case of all of unmelted part of first pass transformed indicated as "Good", case of all of unmelted part of first pass not transformed indicated as "Poor", and case of no unmelted part present at first pass indicated as "—"

Example 5

Example 5 is an example which investigates the effects of the shape of joint. In Examples 1 to 4, the object was to verify the effect of forming the weld metal provided by the present invention in the first pass, then retransforming the weld metal which was formed in the first pass at the final welding pass, so as the joint shapes, joints comprised of U-shaped rib structural members welded to flat plates were used. However, the gist of the present invention is retransformation of the low temperature transformation weld metal which was formed in the first pass by the final pass of welding. It is not limited to such joints. In Example 5, the effects of the present invention were verified by corner joints, lap joints, and T-joints which can only be welded from one side due to the presence of unmelted parts.

Figure 8:
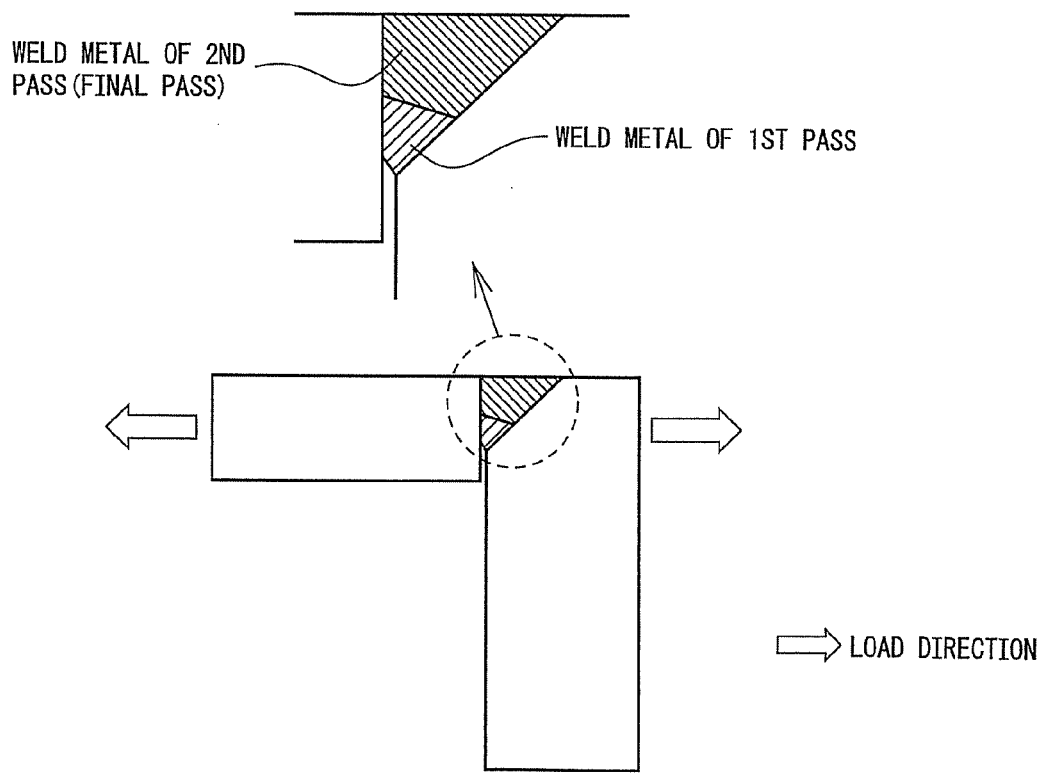
FIG. 8 is a schematic view for explaining a welded joint in the present invention and a partial enlarged view showing a weld zone of a corner joint in Example 5.
Figure 11:
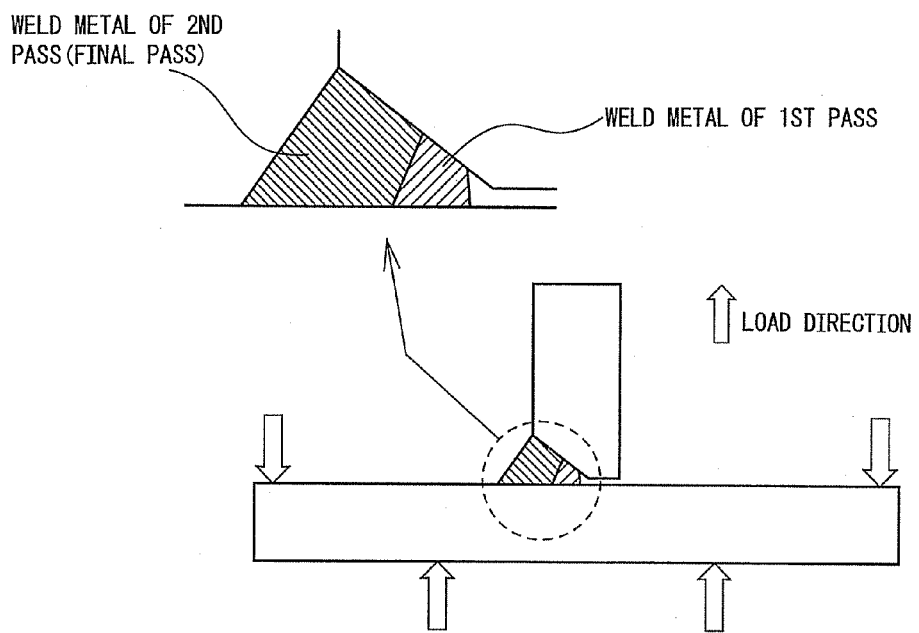
FIG. 11 is a schematic view for explaining one example of the method of production of a welded joint of the present invention and a cross-sectional view showing a load direction when performing a fatigue test on a T-joint in Example 5.

The joints which were employed in Example 5 included the three types of joints shown in FIG. 8, FIG. 10, and FIG. 11. These were corner joints, lap joints, and T-joints. Note that, in the case of the corner joint of FIG. 8, performing a fatigue test is difficult, so as shown in FIG. 9, first the welding operation is performed at one side so that there is no unwelded zone, then a weld is formed corresponding to the corner joint designed for investigating the fatigue characteristics. The lap joint of FIG. 10 was fabricated so that the distance of the left and right lap joint parts became 200 mm. The T-joint of FIG. 11 is a groove of a partially penetrated shape where welding is only possible from the left side and is the case of a joint shape where welding is only possible from one side.

For the welding, SMAW was employed. The welding conditions of the first pass were the same as in Example 1, that is, 130 A-23V-14 cm/min, while the welding conditions of the second pass (final pass) were the two conditions of 150 A-25V-9 cm/min (amount of heat input 2.5 kJ/mm) and 150 A-25V-20 cm/min (amount of heat input 11 kJ/mm). As the weld material of the first pass, the same weld material as No. 1 of Table 1 and No. 102 of Table 2 was used. Due to dilution from the base material, the composition differed somewhat, so weld metal having composition like in Table 8 was formed. For the weld material of the second pass, a weld material for SMAW for 590 MPa shown in Example 1 was used.

Table 9 carries the results of the fatigue test. In Table 9, M1 to M6 are invention examples, while M51 to M56 are comparative examples. Whether or not retransformation occurred was confirmed by obtaining a macro test piece from a joint and observing the microstructure. In Table 9, for each joint, the results of fatigue tests on joints prepared under two types of conditions of amounts of heat input of the final pass of welding of a high 2.5 kJ/mm and a low 1.1 kJ/mm are carried, but as will be understood from Table 9, at 2.5 kJ/mm, all of the weld metal which was formed at the first pass retransforms, but under the conditions of 1.1 kJ/mm, only part of the weld metal which was formed at the first pass was retransformed. In the fatigue test as well, it was confirmed that the invention examples were improved in fatigue strength compared with the comparative examples. Note that, unlike Example 1 etc., for the fatigue strength in Table 9, for corner joints, the value of the fatigue load divided by the cross-section of the weld zone was employed, while for others, the value divided by the cross-section of the steel plate was employed. The reason is that in the joints employed in Example 5, it was difficult to attach a strain gauge near the weld metal which was formed by the first pass of welding. The three comparative examples M57, M58, and M59 of Table 9 are all examples where the weld metal which was formed by the first pass ended up melting and being lost by the second pass and where the fatigue strength was not improved.

As will be understood from Table 9, in the case of the invention examples, the fatigue strengths are higher than the comparative examples. The point that the effects of the present invention are valid not only for T-joints, but also for other joints was verified.

TABLE 8

| | | Chemical composition of weld metal at first weld step (mass %) | | | | | | | | | | | Transformation start temperature | |
|---|---|---|---|---|---|---|---|---|---|---|---|---|---|---|
| Joint type | No. | C | Si | Mn | P | S | Ni | Cr | Mo | Nb | V | Cu | Ti | (° C.) | Remarks |
| Corner joints | 201 | 0.03 | 0.32 | 1.7 | 0.012 | 0.008 | 11.1 | | | | | | | 324 | Inv. ex. |
| | 202 | 0.03 | 0.45 | 1.3 | 0.010 | 0.006 | 5.1 | 13.0 | | | | | | 249 | Inv. ex. |

TABLE 8-continued

| | | Chemical composition of weld metal at first weld step (mass %) | | | | | | | | | | | Transformation start temperature | |
|---|---|---|---|---|---|---|---|---|---|---|---|---|---|---|
| Joint type | No. | C | Si | Mn | P | S | Ni | Cr | Mo | Nb | V | Cu | Ti | (° C.) | Remarks |
| Lap | 203 | 0.03 | 0.32 | 1.7 | 0.012 | 0.008 | 11.1 | | | | | | | 324 | Inv. ex. |
| joints | 204 | 0.04 | 0.41 | 1.2 | 0.010 | 0.006 | 5.3 | 12.6 | | | | | | 245 | Inv. ex. |
| T-joints | 205 | 0.03 | 0.32 | 1.7 | 0.012 | 0.008 | 11.1 | | | | | | | 324 | Inv. ex. |
| | 206 | 0.04 | 0.41 | 1.3 | 0.010 | 0.006 | 5.5 | 12.9 | | | | | | 232 | Inv. ex. |

TABLE 9

| Joint | No. | Composition of weld metal of final pass | Amount of heat input of final pass (second pass) | Unmelted parts[1] | Retransformation[2] | Fatigue strength (MPa) | Remarks |
|---|---|---|---|---|---|---|---|
| Corner | M1 | 201 | 2.5 kJ/mm | Good | Good | 250 | Inv. ex. |
| joints | M2 | 202 | 2.5 kJ/mm | Good | Good | 250 | Inv. ex. |
| | M51 | 201 | 1.1 kJ/mm | Good | Poor | 180 | Comp. ex. |
| | M52 | 202 | 1.1 kJ/mm | Good | Poor | 190 | Comp. ex. |
| | M57 | 202 | 5.0 kJ/mm | Poor | — | 190 | Comp. ex. |
| Lap | M3 | 203 | 2.5 kJ/mm | Good | Good | 260 | Inv. ex. |
| joints | M4 | 204 | 2.5 kJ/mm | Good | Good | 270 | Inv. ex. |
| | M53 | 203 | 1.1 kJ/mm | Good | Poor | 200 | Comp. ex. |
| | M54 | 204 | 1.1 kJ/mm | Good | Poor | 190 | Comp. ex. |
| | M58 | 204 | 5.0 kJ/mm | Poor | — | 200 | Comp. ex. |
| T-joints | M5 | 205 | 2.5 kJ/mm | Good | Good | 260 | Inv. ex. |
| | M6 | 206 | 2.5 kJ/mm | Good | Good | 270 | Inv. ex. |
| | M55 | 205 | 1.1 kJ/mm | Good | Poor | 200 | Comp. ex. |
| | M56 | 206 | 1.1 kJ/mm | Good | Poor | 190 | Comp. ex. |
| | M59 | 206 | 5.0 kJ/mm | Poor | — | 200 | Comp. ex. |

[1] Case of unmelted part present at first pass as "Good", while case of no unmelted part present at first pass indicated as "Poor"
[2] Case of all of unmelted part of first pass transformed indicated as "Good", case of all of unmelted part of first pass not transformed indicated as "Poor", and case of no unmelted part present at first pass indicated as "—"

Example 6

Example 6 is an example relating to T-joints and cross joints welded from the two sides. In the present invention, even in the case of T-joints and cross joints welded from the two sides, the welding at one side does not affect the welding at the other side, that is, there is no effect on the residual stress, so it is possible to view these are independent weld zones. For this reason, the thickness of the weld metal at each welding pass was defined and that thickness was compared with the length of the unwelded zone present between the weld zones at the two sides. In addition to this, for cross joints, a comparison with the plate thickness was also considered.

Figure 12:
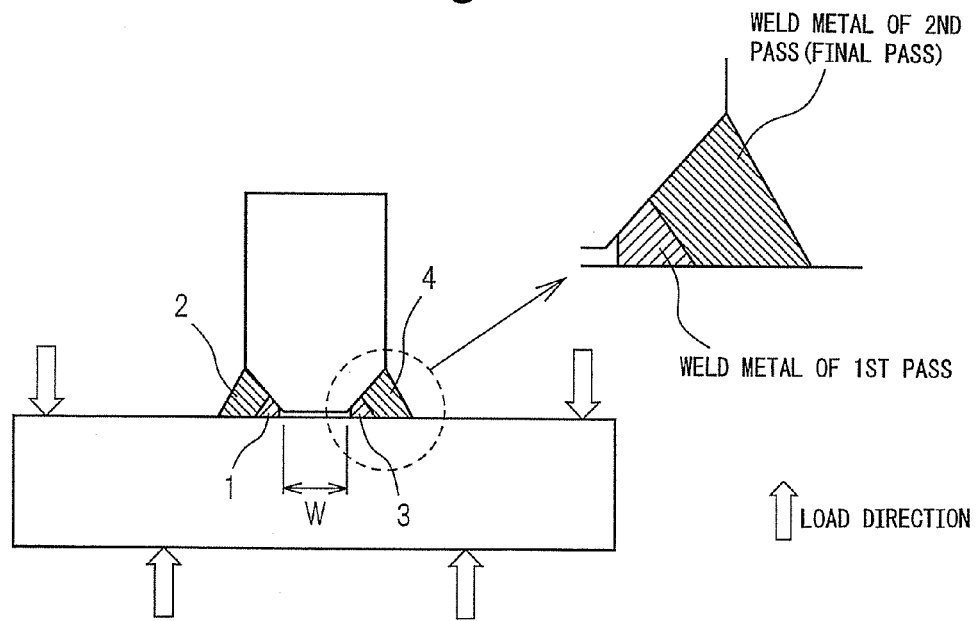
FIG. 12 is a schematic view for explaining one example of the method of production of a welded joint of the present invention and a cross-sectional view showing a load direction when performing a fatigue test on a T-joint welded from the two sides in Example 6.

A T-joint, as shown in FIG. 12, is formed by the weld beads 1, 2, 3, and 4. The weld procedure is performed in the order of 1, 2, 3, and 4. Among these, 1 and 3 are low temperature transformation weld metals of the composition system of 206 shown in Table 8. That is, the welding passes 1 and 3 were performed by the same materials as the weld materials employed in Example 5. These welding operations were performed under the same operating conditions as the operating conditions used for the T-joints in Example 5. Table 10 shows examples of T-joints. In Table 10, the different parameters in the examples were the thickness of the weld bead 4 and the length W of the unwelded zone. Note that, as will be understood from Table 10, in the weld beads 1, 2, 3, and 4, the thickness was the greatest in the weld bead 4. As will be understood from Table 10, the cases where the length W of the unwelded zone is three times or more the thickness of the weld bead 4 are invention examples. Improvement of the fatigue strengths was confirmed. On the other hand, in the comparative examples, no improvement could be seen in the fatigue strengths. Further, in the comparative examples of Table 10, it was learned that the fatigue cracks all occurred from the weld bead 1 side. This is believed to be because the residual stress at the weld bead 1 side is affected by the weld beads 3 and 4 and the effect of the low temperature transformation weld metal is lost.

Figure 13:
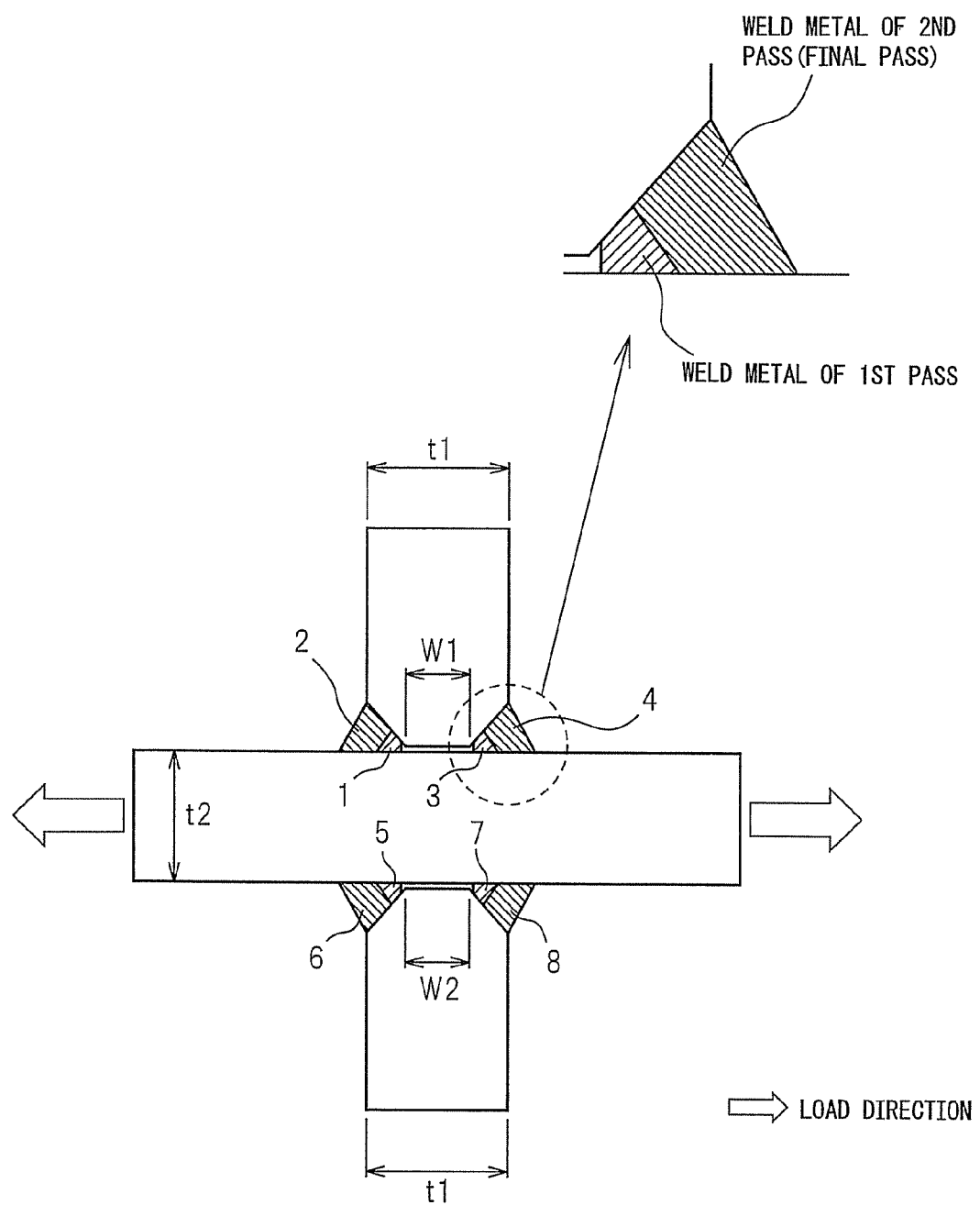
FIG. 13 is a schematic view for explaining one example of the method of production of a welded joint of the present invention and a cross-sectional view showing a load direction when performing a fatigue test on a cross joint in Example 6.

Table 11 shows examples of cross joints. The procedure for fabrication of a cross joint may be considered the procedure for fabrication of a T-joint performed twice for the front and back. Therefore, in the present example, the same procedure as with T-joints was used to fabricate the low temperature transformation weld metals of the cross joints. Therefore, the composition of the low temperature transformation weld metals is the same composition as 206 of Table 8 in Example 5. For cross joints, it is necessary to also consider the length of the plate thickness t2 as in FIG. 13. Note that, in FIG. 13, the plate thickness t1 became shorter than the length W of the unmelted part, so is not described in Table 11. In FIG. 13, the weld metals 1, 3, 5, and 7 are low temperature transformation weld metals with the same composition as 206 of Table 8. Further, as the welding procedure, the welding was performed from the weld bead 1 and continued in the same order as the bead numbers. At this time, a T-joint was fabricated by the weld beads 1 to 4, then the back side T-joint was fabricated by 5 to 8, so as the procedure for fabrication of the T-joints, either the procedure N1 or N2 of Table 10 is applied. According to the procedure of the T-joints, as shown in Table 10, the length of the unwelded zone is sufficiently long, so improvement of the fatigue strength can be expected. For cross joints, in addition to this, it is necessary to also consider the case of affecting the residual stress through the horizontal plate (plate thickness t2) in FIG. 13. For the examples of the cross joints, mainly the effects of t2 were viewed. In Table 11, P1 and P2 are invention examples, while P51, P52, P53, and P54 are comparative examples. In Comparative Examples P51 and P52, both the front T-joint and back T-joint in FIG. 13 were fabricated by the method of fabrication of the T-joint of N1 of Table 10 for which there was an effect of improvement of the fatigue strength, but the plate thickness t2 was 10 mm and 12 mm, that is, not reaching three times the maximum weld bead thickness, so no improvement of the fatigue strength was achieved. The reason can be considered to have been that when forming the weld beads 5, 6, 7, and 8, the weld heat passed through to the surface through the horizontal plate. Similarly, Comparative Examples P53 and P54 also had a t2 below three times (21 mm) the maximum value 7 mm of weld bead thickness, so the fatigue strengths were not improved. In these invention examples, this condition was achieved, so an effect of improvement of the fatigue strength was confirmed.

TABLE 10

| Joint | No. | Weld bead thickness (mm) 1 | 2 | 3 | 4 | W (mm) | W/maximum bead thickness | Retrans-formation[1] | Unmelted parts[2] | Fatigue strength (MPa) | Remarks |
|---|---|---|---|---|---|---|---|---|---|---|---|
| T-joint | N1 | 3 | 5 | 3 | 5 | 16 | 3.2 | Good | Good | 250 | Inv. ex. |
| | N2 | 3 | 5 | 3 | 7 | 23 | 3.3 | Good | Good | 260 | Inv. ex. |
| | N51 | 3 | 5 | 3 | 6 | 16 | 2.7 | Good | Good | 200 | Comp. ex. |
| | N52 | 3 | 5 | 3 | 7 | 18 | 2.6 | Good | Good | 200 | Comp. ex. |
| | N53 | 3 | 5 | 3 | 5 | 10 | 2 | Good | Good | 190 | Comp. ex. |

[1]Case where all of unmelted parts are transformed indicated as "Good", while case where all of unmelted parts not transformed indicated as "Poor"
[2]Case where unmelted part of first pass are present indicated as "Good", while case where all were "melted" indicated as "Poor"

TABLE 11

| Joint | No. | Fabrication conditions of weld beads 1 to 4 | Fabrication conditions of weld beads 5 to 8 | Maximum weld bead thickness (mm) | W (mm) | t2 (mm) | W/maximum bead thickness | t2/maximum bead thickness | Retrans-formation[1] | Unmelted parts[2] | Fatigue strength (MPa) | Remarks |
|---|---|---|---|---|---|---|---|---|---|---|---|---|
| Cross joint | P1 | N1 | N1 | 5 | 16 | 16 | 3.2 | 3.2 | Good | Good | 250 | Inv. ex. |
| | P2 | N2 | N2 | 7 | 23 | 24 | 3.3 | 3.4 | Good | Good | 260 | Inv. ex. |
| | P51 | N1 | N1 | 5 | 16 | 10 | 3.2 | 2 | Good | Good | 180 | Comp. ex. |
| | P52 | N1 | N1 | 5 | 16 | 12 | 3.2 | 2.4 | Good | Good | 190 | Comp. ex. |
| | P53 | N2 | N2 | 7 | 23 | 16 | 3.3 | 2.3 | Good | Good | 190 | Comp. ex. |
| | P54 | N2 | N2 | 7 | 23 | 18 | 3.3 | 2.6 | Good | Good | 200 | Comp. ex. |

[1]Case where all of unmelted parts are transformed indicated as "Good", while case where all of unmelted parts not transformed indicated as "Poor"
[2]Case where unmelted part of first pass are present indicated as "Good", while case where all were "melted" indicated as "Poor"

As explained above, in the case of the invention examples, an effect of improvement of the fatigue strength was confirmed in all cases. It became clear that the invention is industrially significant. Note that, regarding TIG welding without weld material, this is a method which applies heat to the joints, so care should be taken that the compressive residual stress which was introduced to the inside weld toe at the first weld step side not be lost. It is preferable to confirm this before application to an actual structure. Note that, advance confirmation is not a particularly difficult problem for persons in the welding field. At this time, after forming the TIG dressing weld, the residual stress should try to be measured or, like in Example 3, a fatigue test should be run and the results compared with the results of the fatigue test of Example 1.

REFERENCE SIGNS LIST

1 . . . welded structure, 11, 12, 31, 32 . . . steel materials, 21 . . . inside weld toe, 22, 42 . . . outside weld toe, 22a, 22b, 42a, 42b . . . one or both of two ends of bead at outside weld toe, 41 . . . root part, 10, 30 . . . welded joint

The invention claimed is:

1. A method of production of a welded joint comprising joining parts of steel materials by multipass welding, the welded joint having an inside weld toe or a root part, the inside weld toe or the root part being sealed off in structure the welded joint being able to be welded from one side only, the method of production comprising:
 a first weld step of forming a welding metal including the inside weld toe or the root part using a welding material having a transformation start temperature in the range of 175° C. to 400° C.; and
 a second weld step of welding to build up the welding metal by one, two, or more passes from an opposite side of the inside weld toe or the root part of the welding metal so that at least parts of the welding metal which were formed in said first weld step become unmelted parts,
 wherein, during the second weld step, the weld heat of the final pass causes the welding metal including the inside weld toe or the root part, which was formed in the first weld step, to completely retransform to austenite.

2. A method of production of a welded joint comprising joining parts of steel materials by multipass welding the welded joint having an inside weld toe or a root part, the inside weld toe or the root part being sealed off in structure the weld joint being able to be welded from one side only, the method of production comprising:
 a first weld step of forming a welding metal including the inside weld toe or the root part using a welding material having a transformation start temperature in the range of 175° C. to 400° C.;
 a second weld step of welding to build up the welding metal by one, two, or more passes from an opposite side of the inside weld toe or the root part of the welding metal so that at least parts of the welding metal which were formed in said first weld step become unmelted parts; and a step of applying heat treatment which causes the welding metal including the inside weld toe or the root part, which was formed in the first weld step, to completely retransform to austenite.

3. The method of production as set forth in claim 1 or 2, wherein said welded joint is a T-joint, corner joint, or lap joint.

4. The method of production as set forth in claim 1, wherein said welded joint is a T-joint, the joined part of the T-joint is comprised of an unwelded zone and weld zones at the two sides sandwiching said unwelded zone, said weld zones are multipass welded from only one side by partial penetration welding, and a length of said unwelded zone is at least 3 times a maximum value of a weld bead thickness of each pass in said multipass welding.

5. The method of production as set forth in claim 2, wherein said welded joint is a T-joint or cross joint, the joined part of said welded joint is comprised of an unwelded zone and weld zones at the two sides sandwiching said unwelded zone, said weld zones are multipass welded by partial penetration welding from only one side, and said heat treatment is performed after finishing the multipass welding operations for all weld zones.

6. The method of production as set forth in claim 2 or 5, wherein said heat treatment step uses a heating method of either induction heating or ohmic heating.

7. The method of production as set forth in claim 1 or 2, wherein the composition of said welding metal which is used in said first weld step comprises, by mass %, C: 0.01 to 0.15%, Si: 0.2 to 0.8%, Mn: 0.4 to 2.0%, P: 0.03% or less, S: 0.02% or less, and Ni: 7.0 to 11.5% and, furthermore, comprises one or more of Cu: 0.4% or less, Ti: 0.1% or less, Nb: 0.1% or less, V: 0.5% or less, Cr: 3.0% or less, and Mo: 2.0% or less.

8. The method of production as set forth in claim 1 or 2, wherein the composition of said welding metal which is used in said first weld step comprises, by mass %, C: 0.005 to 0.10%, Si: 0.1 to 0.7%, Mn: 0.1 to 2.0%, P: 0.03% or less, S: 0.02% or less, Ni: 4.0 to 8.0%, and Cr: 8.0 to 15.0% and further comprising one or more of Mo: 2.0% or less, Cu: 0.4% or less, Ti: 0.1% or less, Nb: 0.1% or less, and V: 0.5% or less.

9. The method of production as set forth in claim 1 or 2, further comprising:
  after said second weld step, grinding a toe part of the weld bead at the welded side for post-treatment.

10. The method of production as set forth in claim 1 or 2, further comprising:
  after said second weld step, peening a toe part of the weld bead at the welded side for post-treatment.

11. The method of production as set forth in claim 1 or 2, further comprising:
  after said second weld step, reheating by TIG arc welding a toe part of the weld bead at the welded side.

* * * * *